(12) United States Patent
Heo et al.

(10) Patent No.: US 9,435,425 B2
(45) Date of Patent: Sep. 6, 2016

(54) HAPTIC FEEDBACK TRANSMISSION SHIFTING APPARATUS

(71) Applicant: SL Corporation, Daegu (KR)

(72) Inventors: Chun Nyung Heo, Gyeongsangbuk-Do (KR); Jeong Ho Bak, Daegu (KR); Dae Hyung Kim, Gyeongsangbuk-Do (KR)

(73) Assignee: SL Corporation, Daegu (KR)

( * ) Notice: Subject to any disclaimer, the term of this patent is extended or adjusted under 35 U.S.C. 154(b) by 43 days.

(21) Appl. No.: 13/943,544

(22) Filed: Jul. 16, 2013

(65) Prior Publication Data
US 2014/0020496 A1    Jan. 23, 2014

(30) Foreign Application Priority Data

Jul. 19, 2012 (KR) .................. 10-2012-0078859
Aug. 21, 2012 (KR) .................. 10-2012-0091335
Aug. 21, 2012 (KR) .................. 10-2012-0091338

(51) Int. Cl.
| | |
|---|---|
| *F16H 61/24* | (2006.01) |
| *F16H 59/04* | (2006.01) |
| *F16H 59/02* | (2006.01) |
| *F16H 59/10* | (2006.01) |
| *F16H 59/08* | (2006.01) |

(52) U.S. Cl.
CPC ........ *F16H 59/044* (2013.01); *F16H 59/0204* (2013.01); *F16H 59/105* (2013.01); *F16H 2059/082* (2013.01); *F16H 2061/241* (2013.01); *Y10T 74/2003* (2015.01)

(58) Field of Classification Search
USPC ......... 74/473.1, 473.12, 473.21; 200/61, 88; 701/51
See application file for complete search history.

(56) References Cited

U.S. PATENT DOCUMENTS 4,669,335 A * 6/1987 Matsuoka et al. ............ 477/129
4,912,997 A * 4/1990 Malcolm et al. .............. 74/335
(Continued)

FOREIGN PATENT DOCUMENTS

DE    102009038427 A1    2/2011
EP       1900974 A1      3/2008
(Continued)

OTHER PUBLICATIONS

European Search Report dated Jun. 12, 2014 in connection with European Patent Application No. 13181264.6.
(Continued)

*Primary Examiner* — Thomas Tarcza
*Assistant Examiner* — Richard Goldman
(74) *Attorney, Agent, or Firm* — Mintz Levin Cohn Ferris Glovsky and Popeo, P.C.; Kongsik Kim; Carolina Säve

(57) ABSTRACT

An automotive transmission that selects a shift position based on various shift patterns without changing the structure of the automotive transmission. The automotive transmission includes a controller configured to input a selection value based on a shift pattern selected from a plurality of shift patterns and operate a shift lever to move through a moving path based on the selected shift pattern when a shift intention is sensed. When the selection value is input, the shift position is set at an initial position based on the selected shift pattern and actuation power is generating according to the movement of the shift lever. The controller is configured to operate the moving path of the shift pattern based on the selected shift pattern and sense a position of the shift lever using a positing sensing unit.

14 Claims, 29 Drawing Sheets

(56) References Cited

U.S. PATENT DOCUMENTS

| | | | |
|---|---|---|---|
| 6,832,147 B2* | 12/2004 | Vornehm et al. | 701/54 |
| 7,104,152 B2* | 9/2006 | Levin et al. | 74/471 XY |
| 7,650,810 B2* | 1/2010 | Levin et al. | 74/471 XY |
| 8,336,418 B2* | 12/2012 | Giefer et al. | 74/473.23 |
| 2002/0020236 A1* | 2/2002 | Onodera | 74/335 |
| 2002/0080115 A1* | 6/2002 | Onodera | G05G 9/047 345/161 |
| 2002/0128753 A1* | 9/2002 | Numata | G05B 19/106 701/1 |
| 2003/0032523 A1* | 2/2003 | Kato et al. | 477/115 |
| 2003/0172757 A1* | 9/2003 | Yone | 74/335 |
| 2003/0188594 A1* | 10/2003 | Levin | F16H 59/044 74/473.12 |
| 2006/0236800 A1* | 10/2006 | Yone et al. | 74/336 R |
| 2006/0293844 A1* | 12/2006 | Sawaki | 701/207 |
| 2009/0038426 A1* | 2/2009 | Buttolo et al. | 74/473.3 |
| 2009/0248260 A1* | 10/2009 | Flanagan | 701/51 |
| 2011/0005344 A1* | 1/2011 | Haevescher | 74/473.12 |
| 2011/0056318 A1* | 3/2011 | Rake et al. | 74/473.12 |
| 2011/0296943 A1* | 12/2011 | Peukert | 74/473.12 |
| 2013/0025398 A1* | 1/2013 | Choi et al. | 74/473.12 |
| 2013/0061706 A1* | 3/2013 | Wang | 74/473.15 |
| 2014/0012449 A1* | 1/2014 | Arita | 701/22 |
| 2014/0020496 A1* | 1/2014 | Heo et al. | 74/473.12 |
| 2014/0216193 A1* | 8/2014 | Lindner et al. | 74/473.3 |

FOREIGN PATENT DOCUMENTS

| | | |
|---|---|---|
| JP | 2001-046459 A | 2/2001 |
| JP | 2003-178170 A | 6/2003 |
| JP | 4559646 B2 | 10/2010 |
| KR | 10-2004-0094903 A | 11/2004 |
| KR | 10-2009-0111111 A | 10/2009 |
| KR | 10-2012-0037244 A | 4/2012 |
| NL | 2000978 C1 | 5/2008 |

OTHER PUBLICATIONS

European Search Report dated Mar. 24, 2014 in connection with European Patent Application No. 13181264.6.

* cited by examiner

HAPTIC FEEDBACK TRANSMISSION SHIFTING APPARATUS

CROSS-REFERENCE TO RELATED APPLICATION

This application claims priority to and the benefit of Korean Patent Application No. 10-2012-0078859, filed on Jul. 19, 2012, Korean Patent Application No. 10-2012-0091335, filed on Aug. 21, 2012 and Korean Patent Application No. 10-2012-0091338, filed on Aug. 21, 2012, which applications are incorporated herein by reference.

TECHNICAL FIELD

The present invention relates to an automotive transmission that selects a shift position based on various shift patterns without changing the structure of the automotive transmission.

RELATED ART

In general, automotive transmissions change shift position ratios to constantly maintain the rotation of an engine according to the speed of a vehicle. To change the shift position ratio, a shift lever connected to the automotive transmission may be operated. Shift modes of automotive transmissions may be classified into various types including manual transmission and automatic transmission. In the manual transmission, a driver manually changes the shift position ratio (shift position) in the transmission, and in the automatic transmission, the shift positions are automatically changed according to the speed of a vehicle when the driver selects a drive (D) mode.

In addition, a sport mode transmission is used to perform both manual and automatic transmissions using a single shift device. A sport mode transmission allows drivers to operate manual transmission by increasing or decreasing the gear stage while operating automatic transmission. Alternatively, the sport mode transmission may be performed by separately providing an automatic shift device in addition to a manual shift device.

As described above, the shift modes of the automotive transmission may be classified into automatic and manual transmissions, and sometimes, a sport mode which uses both automatic shifting styles and the manual shifting styles.

However, since an automatic and a manual transmission have different selectable shift positions, the structure becomes complicated and the cost is increased. In addition, for the same transmission mode, drivers may have different preferred shift patterns. Therefore, it may be difficult to configure different shift patterns according to the driver's preference. Therefore, there is a demand for a technique in which the driver may easily select the shift mode based on preference while preventing the structure and cost from increasing.

SUMMARY

The present invention provides an automotive transmission that selects a shift position based on various shift patterns without changing the structure of the automotive transmission. The present invention also provides an automotive transmission that detects a driver's shift intention, selects a shift position and controls actuation power based on the sensed driver's shift intention. In addition, the present invention provides an automotive transmission that executes various vehicle functions according to shift position selected.

In accordance with one aspect of the present invention, an automotive transmission may include a shift pattern selection unit configured to input a selection value based on a shift pattern selected from a plurality of shift patterns, and a shift control unit configured to operate a shift lever to move through a moving path based on the shift pattern selected from the plurality of shift patterns when a driver's shift intention is detected, wherein when the selection value is input, the shift position may be set at an initial position based on the selected shift pattern, and wherein the shift control unit may include an actuation power generation unit configured to generate actuation power based on the movement of the shift lever, a moving path controller configured to operate the moving path of the shift pattern based on the selected shift pattern, and a position sensing unit configured to sense a position of the shift lever.

BRIEF DESCRIPTION OF THE DRAWINGS

The objects, features and advantages of the present invention will be more apparent from the following detailed description in conjunction with the accompanying drawings, in which:

FIG. 35 is an exemplary drawing showing a shift lever used for controlling vehicle functions according to yet another embodiment of the present invention.

DETAILED DESCRIPTION

Figure 1:
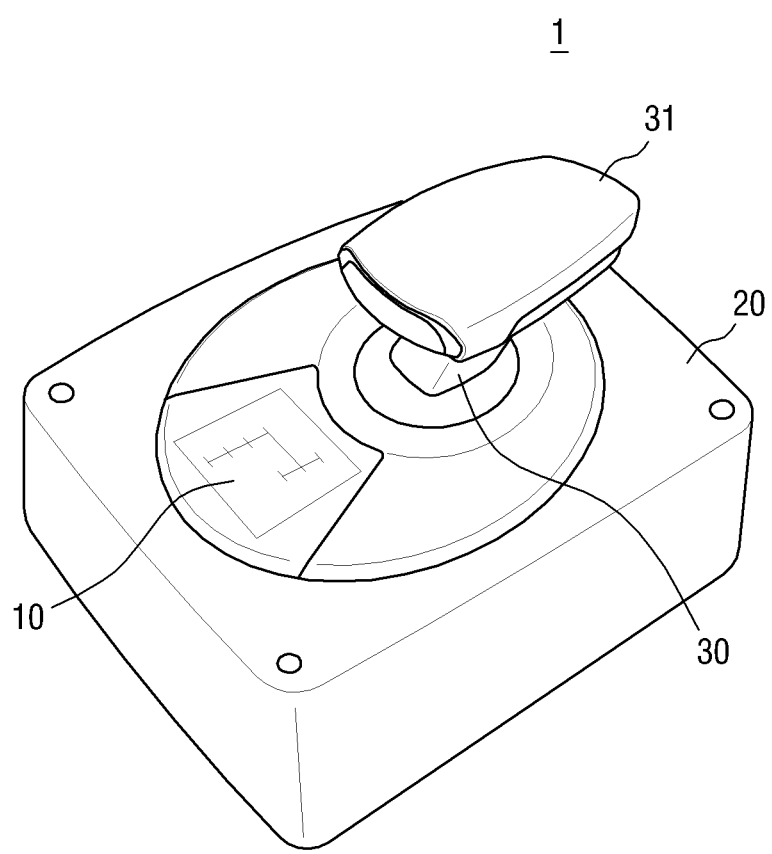
FIG. 1 is an exemplary view of an automotive transmission according to an embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the accompanying claims. Like numbers refer to like elements throughout.

In addition, the terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, as used herein, the term "and/or" includes any and all combinations of one or more of the associated listed items.

In addition, embodiments described herein will be described referring to perspective views, cross-sectional views, side views and/or by way of ideal schematic views of the invention. Accordingly, the exemplary views may be modified depending on manufacturing technologies and/or tolerances. Therefore, the embodiments of the invention are not limited to those shown in the views, but include modifications in configuration formed based on manufacturing processes. In addition, in the drawings, various components are enlarged or reduced in size for the sake of convenient explanation.

Hereinafter, automotive transmission according to exemplary embodiments of the invention will be described in detail with reference to the accompanying drawings. FIG. 1 is an exemplary view of an automotive transmission according to an embodiment of the present invention. As shown in FIG. 1, the automotive transmission 1 may include a shift pattern selection unit 10 and a shift control unit 20.

The shift pattern selection unit 10 may be configured to receive a selection value that corresponds to one shift pattern selected from a plurality of shift patterns. In addition, the shift pattern selection unit 10 may include a display device configured to display the plurality of shift patterns in a predetermined order. The driver may identify the plurality of shift patterns displayed via the shift pattern selection unit 10 and may select one of the plurality of shift patterns. The shift pattern selectable by the driver may be at least one shift pattern included in various shift modes, such as an automatic an automatic shift mode, a manual shift mode, and, a sport mode.

Furthermore, the shift pattern selection unit 10 may be configured to sequentially display the plurality of shift patterns in a predetermined order, which will be described with regard to when the shift pattern selection unit 10 includes a display device using a touch screen method to allow a driver to identify a displayed shift pattern and to select a desired shift pattern. The driver moves his/her finger when the finger contacts or approaches the screen of the shift pattern selection unit 10, and the shift pattern selection unit 10 may display the next shift pattern in a moving direction of the finger. In other words, the shift pattern selection unit 10 may be configured to slidably display the plurality of shift patterns in a predetermined order, and a shift pattern may be selected based on driver preference from the plurality of shift patterns.

In the exemplary embodiment of the present invention, the invention is described with regard to when the shift pattern selection unit 10 includes a display device using a touch screen method, which is, however, provided by way of example only for a better understanding of the present invention. The shift pattern selection unit 10 may include a button or a switch to allow the driver to select a desired shift pattern from the plurality of shift patterns. In addition, the embodiment of the present invention is described with regard to when the shift pattern selection unit 10 displays only one shift pattern on one screen, but aspects of the present invention are not limited thereto. In other words, a plurality of shift patterns may be simultaneously displayed on one screen.

Figure 2:
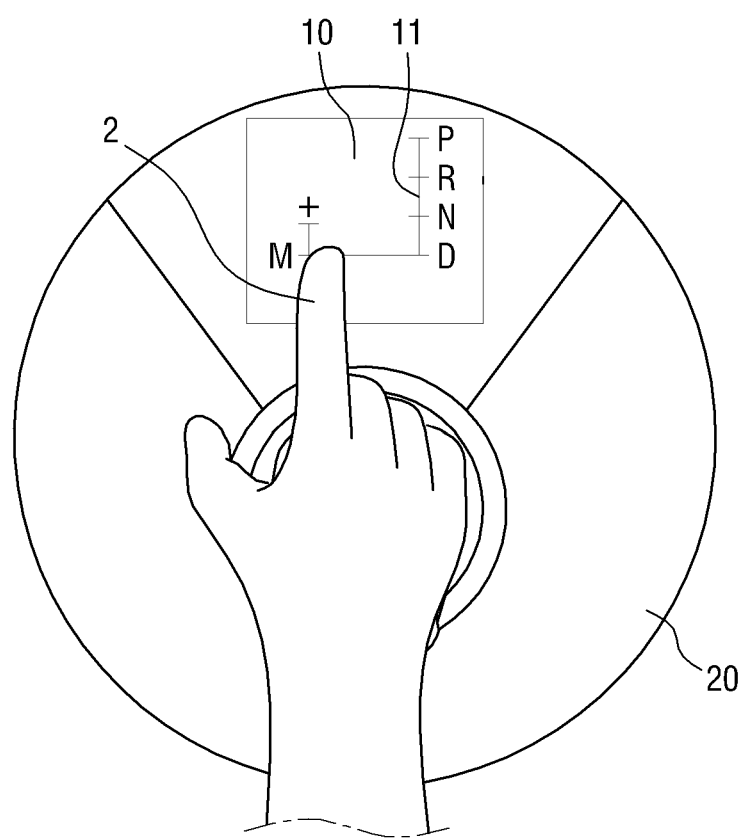
FIGS. 2 to 4 are exemplary schematic views illustrating a shift pattern selection unit according to an embodiment of the present invention.
Figure 3:
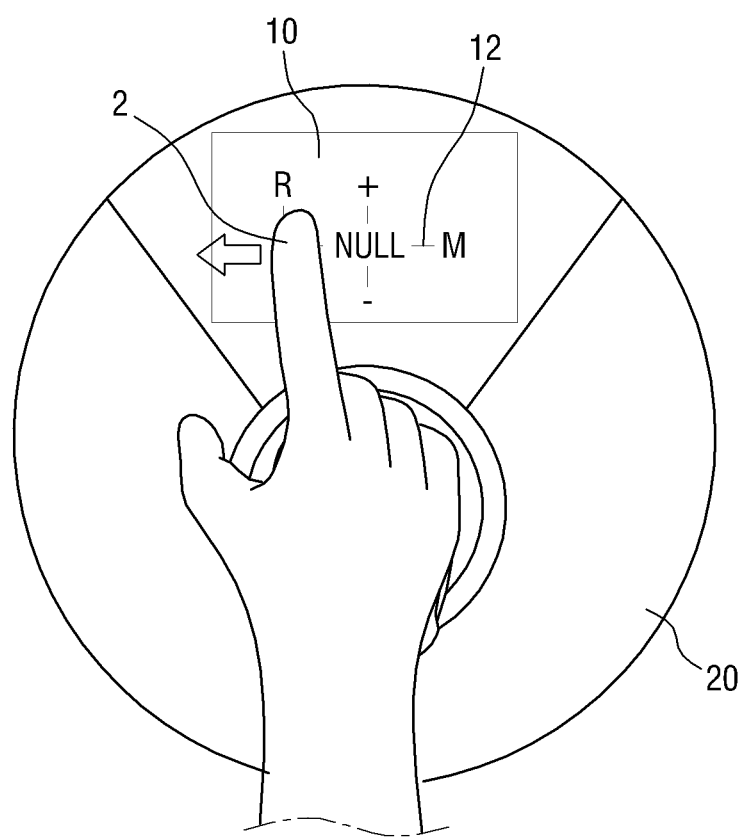
Figure 4:
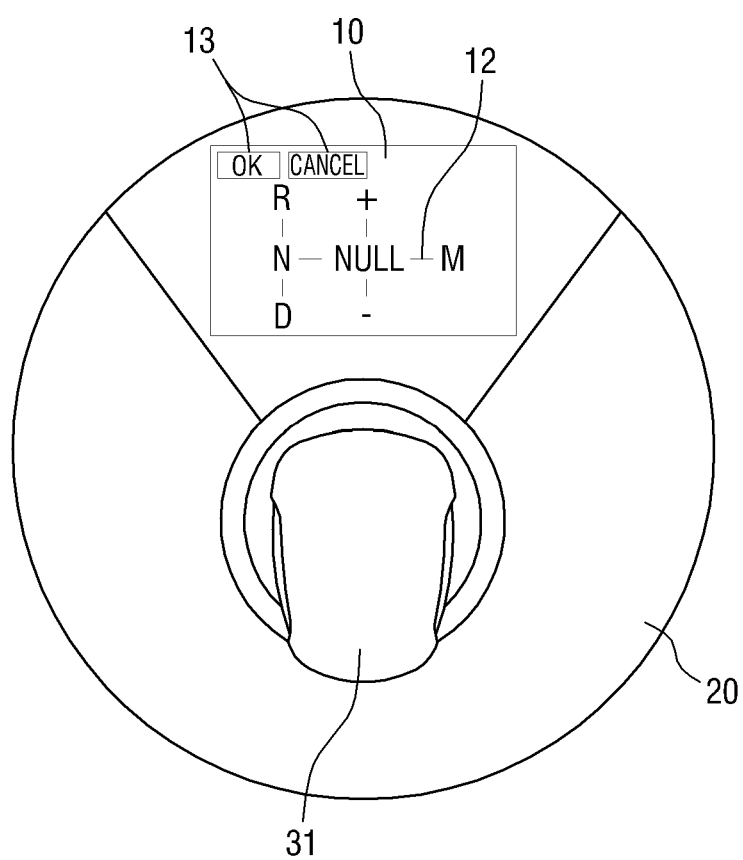

The process of the driver selecting a shift pattern using the shift pattern selection unit 10 will now be described. As shown in FIG. 2, when a first shift pattern 11 is displayed on the shift pattern selection unit 10 and the driver contacts or approaches the finger 2 on the shift pattern selection unit 10, the driver moves the finger 2 in one direction indicated by an arrow, as shown in FIG. 3. Then, the shift pattern displayed on the shift pattern selection unit 10 changes from the first shift pattern 11 into a second shift pattern 12, and when the finger 2 is moved and then separated from the shift pattern selection unit 10, the second shift pattern 12 may be displayed, as shown in FIG. 4. The order in which the shift patterns are displayed on the shift pattern selection unit 10 may be modified in various manners.

In addition, the shift pattern selection unit 10 may include an input unit 13 that includes a plurality of buttons for selecting or cancelling the shift pattern displayed on the shift pattern selection unit 10, as shown in FIG. 4. In the exemplary embodiment of the present invention, the invention is described with regard to when the shift pattern selection unit 10 includes buttons of, for example, "OK" and "CANCEL" displayed on the display device suing a touch screen method, but aspects of the present invention are not limited thereto. In other words, the shift pattern selection unit 10 may include a separate button or a switch installed within a vehicle, and the shift pattern selection unit 10 may be configured to receive an input value for a shift pattern selected by the input unit 13 from the plurality of shift patterns.

Figure 5:
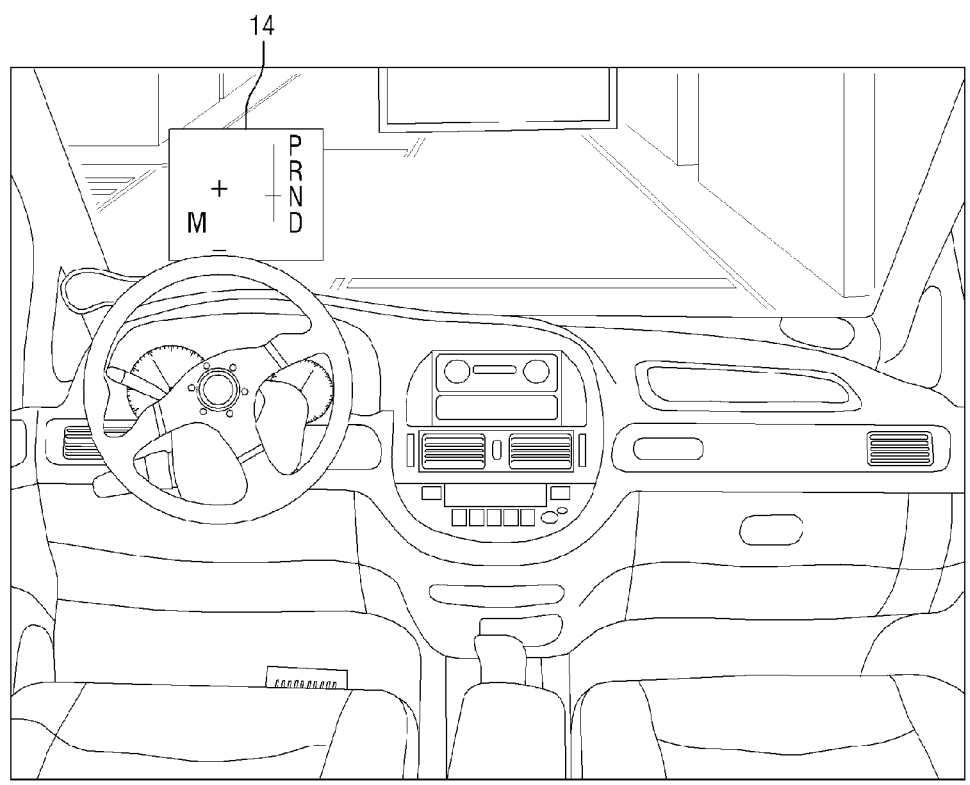
FIG. 5 is an exemplary schematic view illustrating a screen displayed via a head up display (HUD) according to an embodiment of the present invention.
Figure 6:
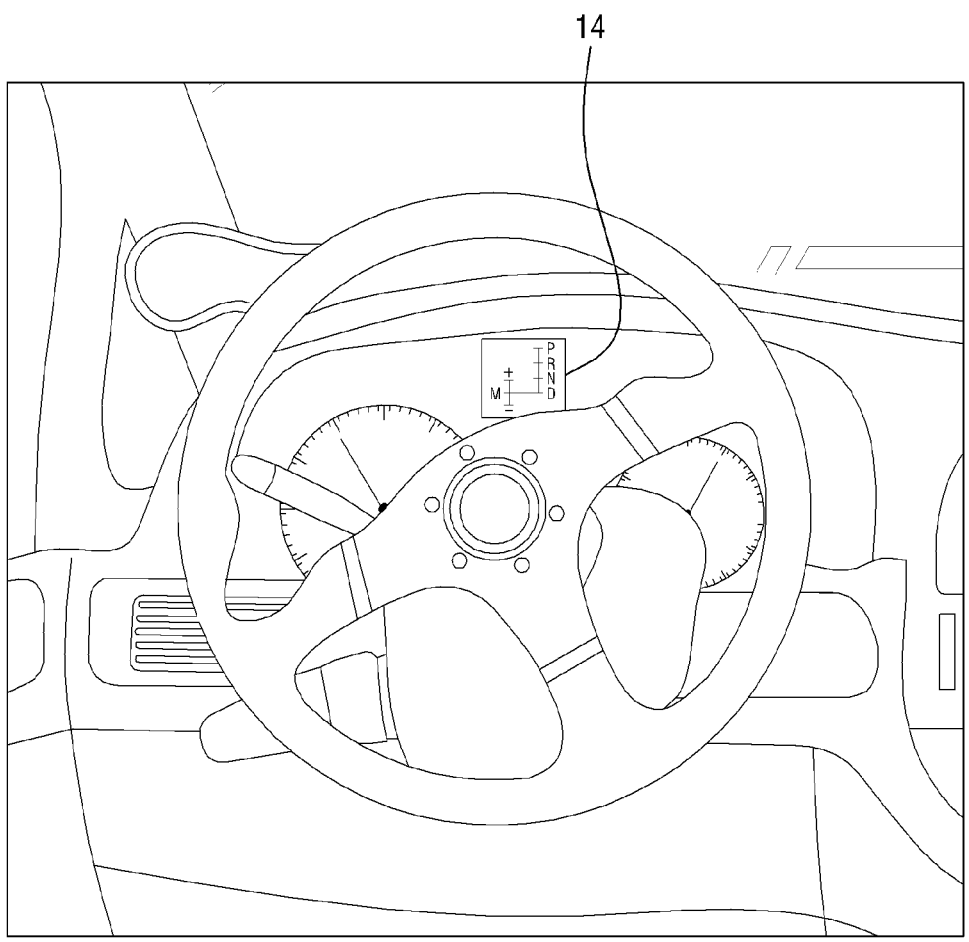
FIG. 6 is an exemplary schematic view illustrating a screen displayed via a cluster according to an embodiment of the present invention.

Moreover, the shift pattern selection unit 10 may allow the driver to recognize the selected shift pattern or the shift position even while the driver is driving, by outputting the selected shift pattern or the shift position on a separate display screen. In particular, the shift pattern selection unit 10 may be configured to output the selected shift pattern or the shift position via a head up display (HUD) or a cluster. For example, the shift pattern selection unit 10, may be configured to output a display screen 14 to display the shift pattern or the shift position selected via the HUD in front of the driver, as shown in FIG. 5, or may be configured to output the display screen 14 to display the shift pattern or the shift position selected via the cluster, as shown in FIG. 6.

The shift control unit 20 may include a shift lever 30 that may select a shift position by moving in at least one direction, and a knob 31 that serves as a handle may be installed at an end of the shift lever 30 to allow the driver to grasp and move the knob 31 to move the shift lever 30, thereby selecting a shift position. In particular, the shift lever 30 moves in two directions perpendicular to each other to then select a shift position, which will now be provided by way of example. In addition, the shift control unit 20 may further include components linked with the shift lever 30 to select a shift position or to implement a shift lock function.

When one of the plurality of shift patterns is selected using the shift pattern selection unit 10, the shift position may be set to an initial position based on the selected shift pattern. The initial position may be a park (P) position or a neutral (N) position, but aspects of the present invention are not limited thereto. In addition, the setting of the shift position into the initial position may selectively require movement of the shift lever 30. For example, the current position may be set to the initial position without moving the shift lever 30, or a shift position based on the shift pattern selected by moving the shift lever 30 may be set to the initial position.

Specifically, the shift pattern may be set to the initial position based on the selected shift pattern for the following reason. When the shift pattern is changed from a shift pattern selected from the plurality of shift patterns into another, when the shift position is not set to the initial position, the shift position that the shift lever 30 is currently positioned in may be difficult to be detected. The setting of the initial position based on the shift pattern selected when the shift lever 30 moves may be performed by the actuation power generation unit 100, which will later be described.

Figure 7:
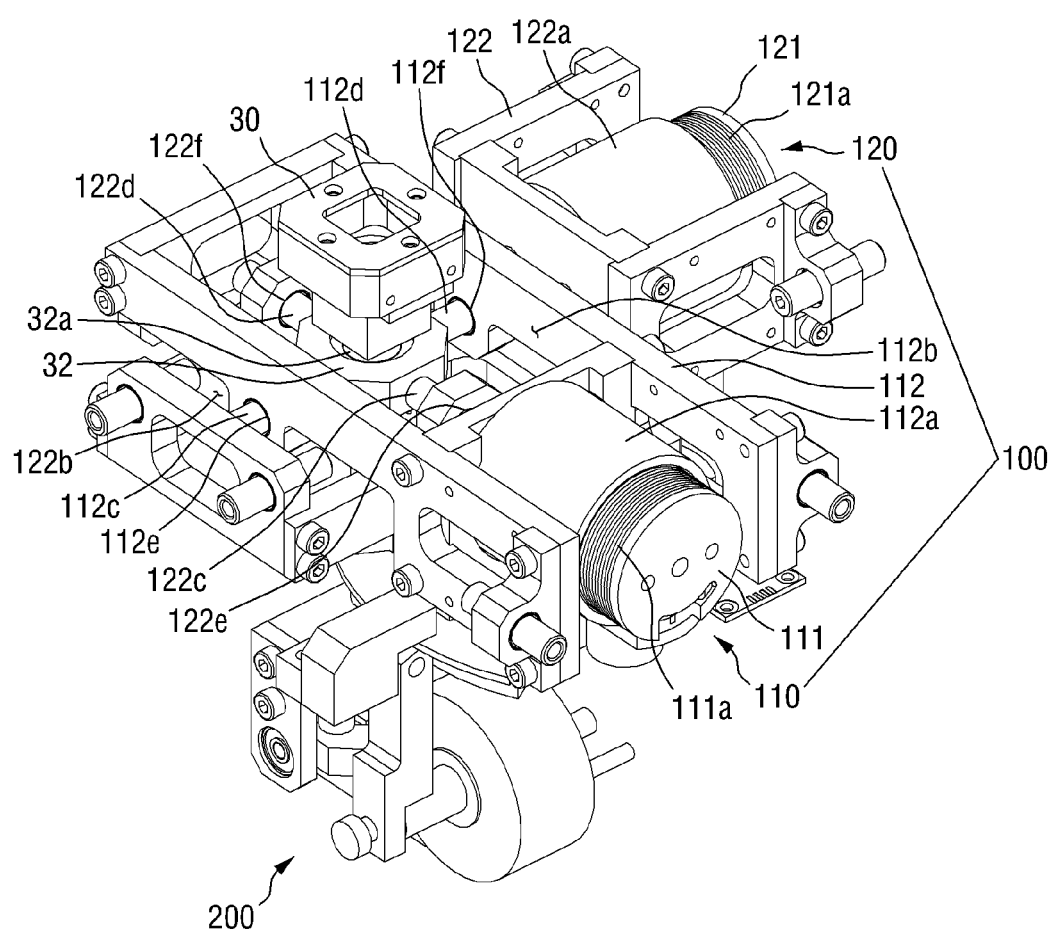
FIG. 7 is an exemplary view of a shift control unit according to an embodiment of the present invention.
Figure 8:
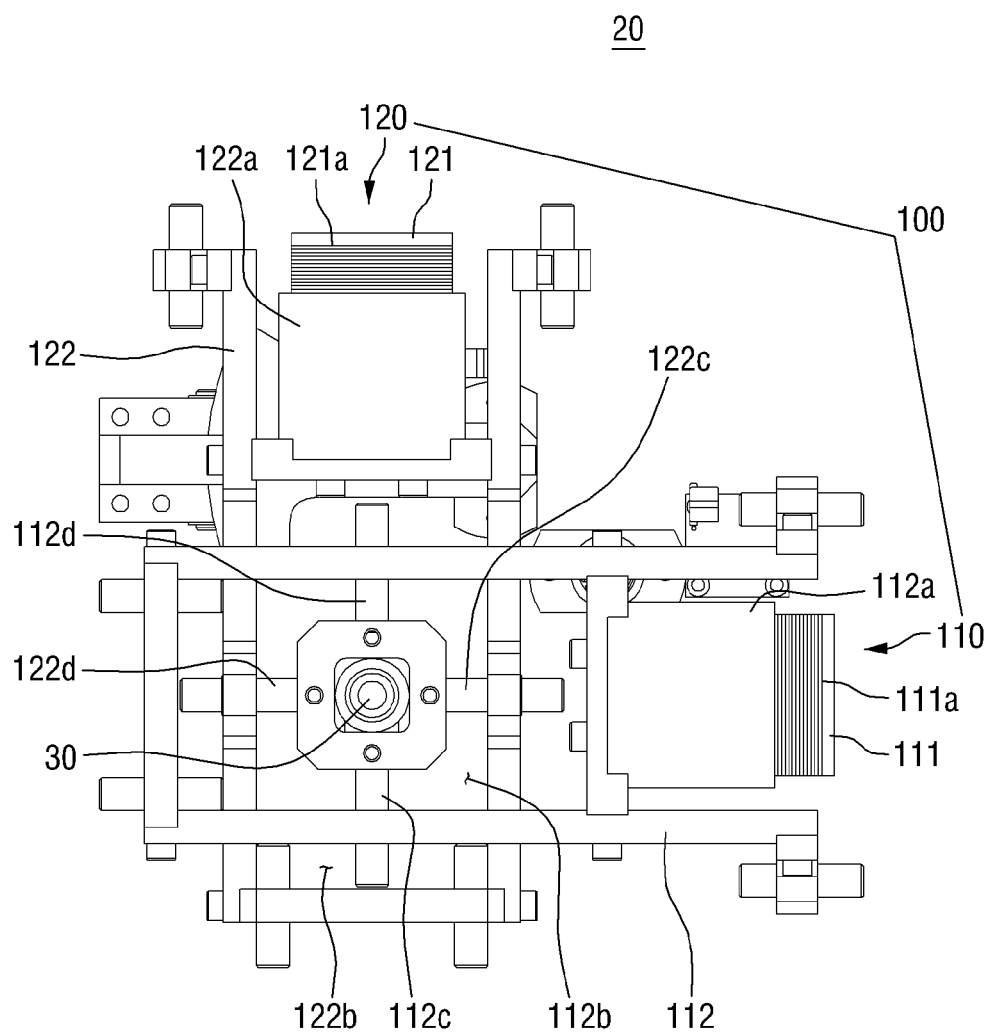
FIG. 8 is an exemplary plan view of a shift control unit according to an embodiment of the present invention.

FIG. 7 is an exemplary view of a shift control unit according to an embodiment of the present invention and FIG. 8 is an exemplary plan view of a shift control unit according to an embodiment of the present invention.

As shown in FIG. 7, the shift control unit 20 may be connected to the shift lever 30, and may include an actuation power generation unit 100 configured to generate actuation power by applying power to the shift lever 30 in at least one direction when the shift lever 30 moves based on the selected shift pattern, and a moving path controller 200 connected to the actuation power generation unit 100 and configured to limit movement of the shift lever 30, thereby allowing the shift lever 30 to move according to the moving path of the selected shift pattern.

In the exemplary embodiment of the present invention, the actuation power generation unit 100 may include a plurality of driving units 110 and 120. The plurality of driving units 110 and 120 may be referred to as a first driving unit 110 and a second driving unit 120, respectively, and the following description will be made by way of example with regard to when the shift lever 30 is operated when it moves in first and second directions based on the selected shift pattern and power is applied to the shift lever 30.

The exemplary embodiment of the present invention is described with regard to when the first and second directions are perpendicular to each other. FIGS. 7 and 8 illustrate exemplary embodiments in which the first driving unit 110 and the second driving unit 120 apply power to the shift lever 30 in at least one of the in first and second directions, like the shift lever 30. In addition, the actuation power generated in the shift lever 30 may be understood as a combination of multiple values of power applied by the plurality of driving units 110 and 120.

The first driving unit 110 and the second driving unit 120 applying the power to the shift lever 30 may be configured to generate the actuation power to give the driver an actuation feel when the driver moves the shift lever 30 to select a shift position. Different types of actuation power may be generated according to the driver's intended shift position, which will later be described.

The first driving unit 110 may include a first fixing part 111 and a first moving part 112. The first driving unit 110 may include a voice coil motor (VCM) and may be configured to operate movement of the first moving part 112 according to the control signal applied to the first fixing part 111. In other words, the first driving unit 110 may control a moving distance or force of the first moving part 112 according to the control signal applied to a coil 111a wound on the first fixing part 111. In the exemplary embodiment of the present invention, the first fixing part 111 may be a cylinder shape having the coil 111a wound around an outer circumference thereof. A cylindrical hollow, like the first fixing part 111, may be formed at one side of the first moving part 112 into which the first fixing part 111 may be inserted, and a first moving groove 112a may be formed in the first direction according to the control signal applied to the coil 111a.

The first moving part 112 may have a first hollow 112b through which the shift lever 30 may pass, and a plurality of first insertion grooves 112e and 112f may be formed at opposite sides of the first hollow 112b into which first ends of the plurality of first loads 112c and 112d connected to opposite sides of the shift lever 30 in the second direction may be inserted.

Moreover, the second driving unit 120 may include a second fixing part 121 and a second moving part 122. Similar to the first driving unit 110, the second driving unit 120 may include a VCM and may be configured to operate movement of the second moving part 122 according to the control signal applied to the second fixing part 121. In other words, the second driving unit 120 may control a moving distance or force of the second moving part 122 according to the control signal applied to a coil 121a wound on the second fixing part 121. In the exemplary embodiment of the present invention, similar to the first fixing part 111, the second fixing part 121 may be a cylinder shape having the coil 121a wound around an outer circumference thereof. A cylindrical hollow, like the second fixing part 121, may be formed at one side of the second moving part 122 into which the first fixing part 111 may be inserted, and a second moving groove 122a may be formed in the second direction according to the control signal applied to the coil 121a.

The second moving part 122 may be positioned to be perpendicular to the first moving part 112 and has a second hollow 122b formed therein to allow the shift lever 30 to pass therethrough. A plurality of second insertion grooves 122e and 122f may be formed at opposite sides of the second hollow 122b into which first ends of the plurality of second loads 122c and 122d connected to opposite sides of the shift lever 30 in the first direction may be inserted. The second moving part 122 may be positioned to be perpendicular to the first moving part 112 and may be disposed under the first moving part 112, but aspects of the present invention are not limited thereto. That is, the second moving part 122 may be configured in a manner contrary to that stated above.

The invention is described with regard to when the first driving unit 110 and the second driving unit 120 include a VCM, which is, however, provided by way of example only for a better understanding of the present invention. The first driving unit 110 and the second driving unit 120 may include various kinds of motors.

Figure 9:
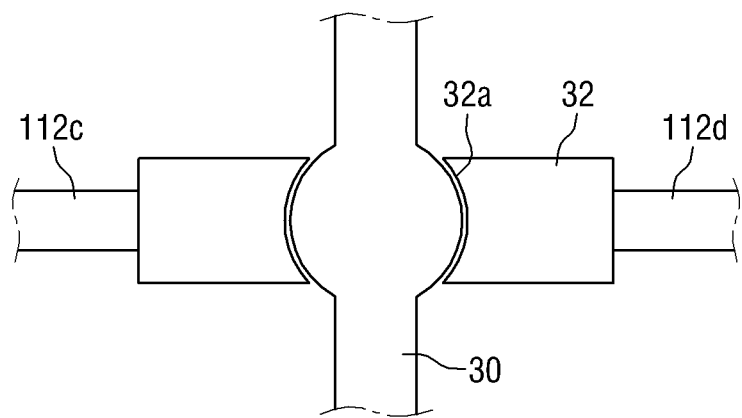
FIG. 9 is an exemplary schematic view illustrating a connection member according to an embodiment of the present invention.

Meanwhile, as shown in FIG. 9, the shift lever 30 may pass through a hollow 32a of a connection member 32 connected to the plurality of first loads 112c and 112d and the plurality of second loads 122c and 122d.

An inner surface of the hollow 32a of the connection member 32 and a surface of the shift lever 30 that contact the inner surface of the hollow 32a of the connection member 32 may be curved (e.g., spherical). Thus, even when the shift lever 30 rotates about its one end and moves in the first direction or the second direction, the first moving part 112 and the second moving part 122 may linearly move while preventing the connection member 32 from deviating from the shift lever 30. FIG. 9 illustrates an exemplary embodiment in which the plurality of first loads 112c and 112d are connected to opposite sides of the connection member 32. The plurality of second loads 122c and 122d may be connected to the connection member 32 in substantially the same manner as in FIG. 9, except for directions in which the plurality of second loads 122c and 122d are connected.

The first moving part 112 and the second moving part 122 will now be described in more detail. When the first moving part 112 moves in the first direction, the plurality of second loads 122c and 122d may be moved by the plurality of second insertion grooves 122e and 122f. Similarly, when the second moving part 122 is moved in the second direction, the plurality of first loads 112c and 112d may be moved by the plurality of first insertion grooves 112e and 112f.

In the exemplary embodiment of the present invention, the invention is described with regard to when the first moving part 112 moves in the first direction and the second moving part 122 moves in the second direction, the shift lever 30 may be moved by the connection member 32, the plurality of first loads 112c and 112d and the plurality of second loads 122c and 122d in an arbitrary direction within movement ranges of the first moving part 112 and the second moving part 122. Accordingly, the shift lever 30 may move based on the shift pattern having various moving paths, such as in horizontal, vertical and diagonal directions.

As described above, the first driving unit 110 and the second driving unit 120 may be configured to set the shift position to an initial position for the selected shift pattern when one shift pattern from the plurality of shift patterns is selected by the driver. In other words, as described above, in the exemplary embodiment of the present invention, when the shift position is set to the initial position based on the selected shift pattern, the current position may be set to the initial position without moving the shift lever 30, or a shift position based on the shift pattern selected by moving the shift lever 30 may be set to the initial position. In the latter case, power may be applied to the shift lever 30 by at least one of the first driving unit 110 and the second driving unit 120, to set the shift position to the initial position.

Moreover, the first driving unit 110 and the second driving unit 120 may be configured to generate actuation power according to profiles that vary according to the shift position selected based on the current shift position in the selected shift pattern by the control signal applied. For example, the first driving unit 110 and the second driving unit 120 may be configured to generate actuation power according to various profiles that indicate the power applied in at least one direction of a reverse direction and a forward direction with respect to the moving direction of the shift lever 30 in various conditions, including a condition in which the driver selects another shift position adjacent from the current shift position, a condition in which the driver selects another shift position via at least one middle shift position from the current shift position, and a condition in which the driver selects a particular shift position and the shift position is restored to an original position.

In the exemplary embodiment of the present invention, the invention is described with regard to when the first driving unit 110 and the second driving unit 120 generate actuation power according to first to third profiles for the conditions stated above. The actuation power generated in the shift lever 30 may be understood as a combination of multiple values of power applied to the shift lever 30 by at least one of the first driving unit 110 and the second driving unit 120.

FIGS. 10 to 13 are exemplary graphs illustrating a first profile, a second profile and a third profile according to an exemplary embodiment of the present invention. In FIGS. 10 to 13, the term "actuation power" means the power applied to the shift lever 30 when the driver applies power to the shift lever 30 to move the shift lever 30. A positive value of the actuation power indicates the power applied in the reverse direction with respect to the moving direction of the shift lever 30 and a negative value of the actuation power indicates the power applied in the forward direction with respect to the moving direction of the shift lever 30. In addition, the term "position" means the shift position selected when the shift lever 30 moves. Therefore, the shift lever 30 may be moved when the driver applies power to the shift lever 30, the power exceeding that applied by the first driving unit 110 and the second driving unit 120 in the reverse direction, as shown in FIGS. 10 to 13.

Figure 10:
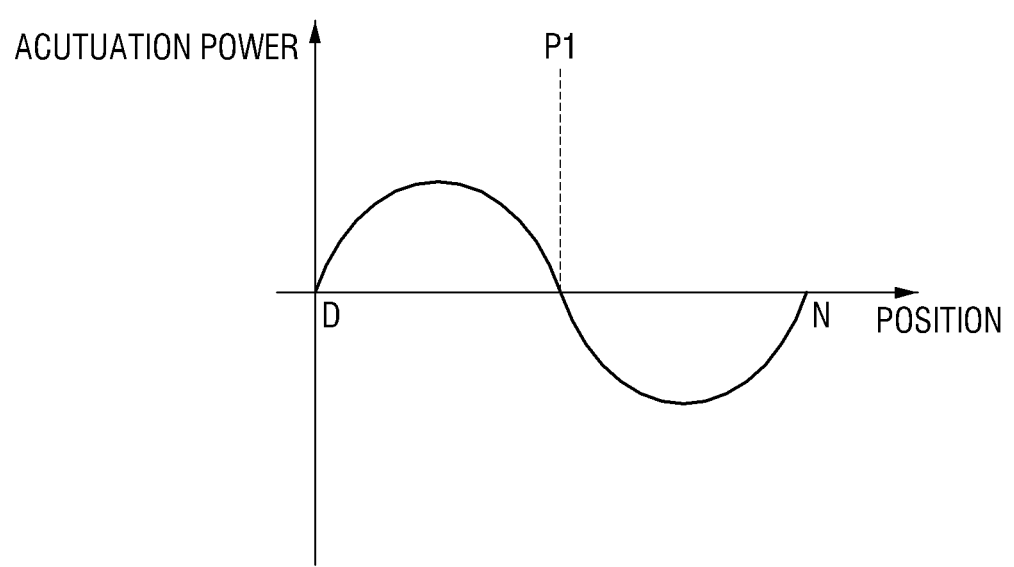
FIGS. 10 and 11 are exemplary graphs illustrating a second profile according to an embodiment of the present invention.
Figure 11:
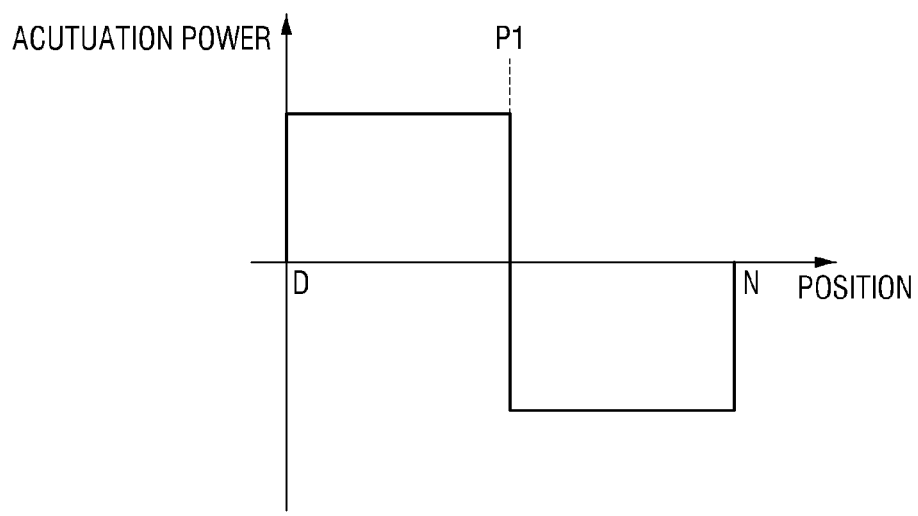

As shown in FIGS. 10 and 11, in the second profile, the actuation power may be generated when the shift position is moved from a first shift position to a second shift position in a shift pattern selected by the shift pattern selection unit 10. Specifically, the power is applied in the reverse direction with respect to a reference point P1 on the moving path of the shift lever 30 from when the shift lever starts to move from the first shift position to the second, and the power is then applied in the forward direction after the reference point P1, to select the shift position when the driver does not apply power to the shift lever 30.

Figure 14:
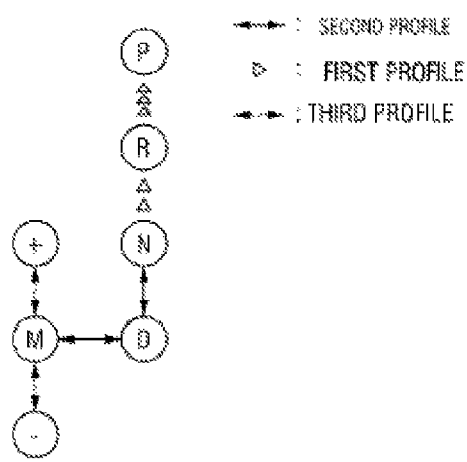
FIG. 14 is an exemplary graph illustrating a profile for each shift position in a shift pattern according to an embodiment of the present invention.

For example, in such a shift pattern as shown in FIG. 14, when the current shift position is at a D position and the driver intends to select an N position, the driver may apply power to move the shift lever 30 from the D position in the reverse direction with respect to the moving direction of the shift lever 30 up to the reference point P1, and after the reference point P1, the power may be applied in the forward direction with respect to the moving direction of the shift lever 30, thus, the N stage may be selected even without the driver applying the power to the shift lever 30.

In FIG. 10, the power pattern is slope- shaped showing that the power applied in the reverse direction and the power applied in the forward direction gradually increase up to peak values and then decrease power, respectively. In FIG. 11, the power pattern shows that the peak values of the power applied in the reverse direction and the power applied in the forward direction are maintained at constant levels, which is, however, provided only for illustration of one example of the actuation power generated in the second profile according to the exemplary embodiment of the present invention. In other words, various power patterns may be provided according to the actuation power generated.

Figure 12:
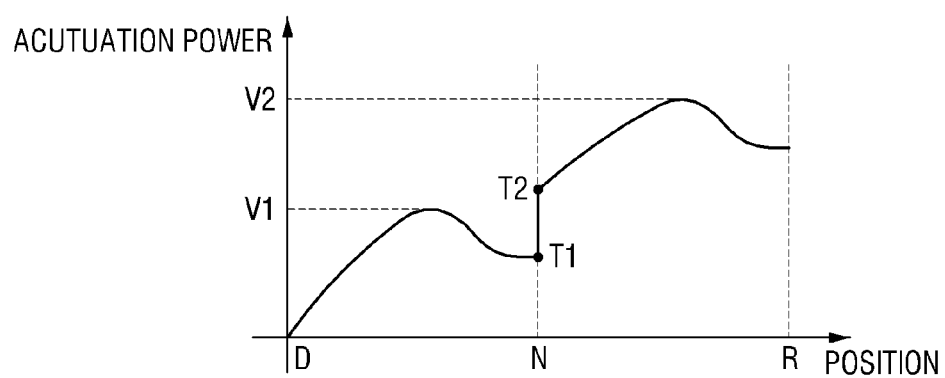
FIG. 12 is an exemplary graph illustrating a first profile according to an embodiment of the present invention.

As shown in FIG. 12, in the first profile, the actuation power may be generated when the shift position is moved from a first shift position to a second shift position (e.g., a next shift position) via at least one middle shift position from the current shift position. In particular, peak values V1 and V2 applied between the shift positions through which the shift lever 30 passes may be gradually increased to select another shift position. For example, in a shift pattern as shown in FIG. 14, when the current shift position is at a D position and the driver intends to select an R position, the driver may apply power to move the shift lever 30 from the D position causing the peak value V2 of the power applied in the reverse direction to select the R position via the N position to exceed the peak value V1 of the power applied in the reverse direction to select the N position.

In particular, the power applied at a time T1 when the shift lever 30 moves from the D position and then reaches the N position and the power applied at a time T2 when the shift lever 30 starts to move from the N position to the R position may be set to have different magnitudes, to inform the driver that the shift lever 30 reaches the R position via at least one middle shift position. In particular, the exemplary embodiment of the present invention is described by way of example with regard to when the power applied at the time T2 is greater than the power applied at the time T1.

In other words, when the driver intends to move the current shift position from the D position to select the R position via the N position, to select the N position and then select the R position, the shift lever 30 may be moved to the R position by applying the power having a substantially great magnitude to the shift lever 30 by a difference between the power applied at the time T2 and the power applied at the time T1. The magnitudes of the power applied at the time T1 and the power applied at the time T2 may be different from each other, which is, however, provided by way of example only for a better understanding of the present invention. The magnitudes of the power applied at the time T1 and the power applied at the time T2 may be equal to each other.

As described above with reference to FIG. 12, the power between the shift positions may be patterned such that power values gradually increase up to respective peak values and then gradually decrease, but aspects of the present invention are not limited thereto. In other words, various power patterns may be provided according to the actuation power generated.

Therefore, in the first profile, the peak value of the power applied to select another shift position via at least one middle shift position may be greater than that of the power applied to select one shift position, thereby preventing an unwanted shift position from being selected due to driver's erroneous operation while informing the driver that the intended shift position is selected via one or more middle shift positions.

Figure 13:
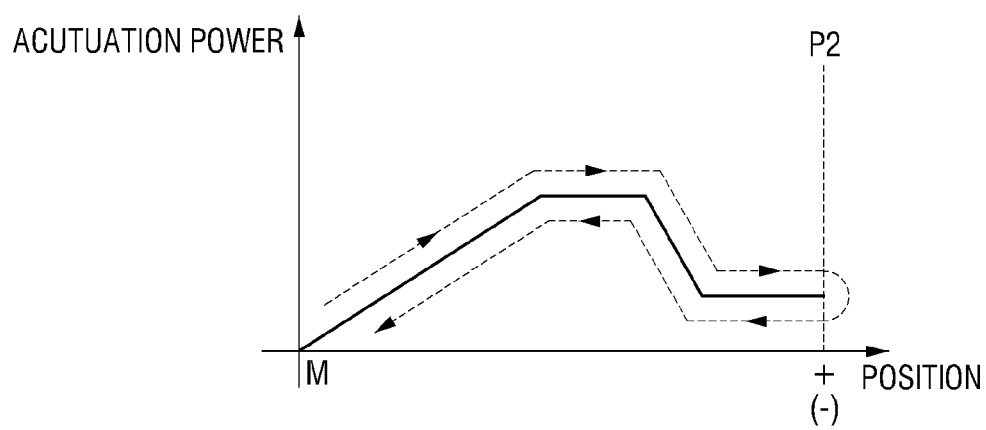
FIG. 13 is an exemplary graph illustrating a third profile according to an embodiment of the present invention.

As shown in FIG. 13, in the third profile, the actuation power may be generated when the driver selects a particular shift position and the shift lever 30 may be restored to an original position. The actuation power may be understood as the power continuously applied in the reverse direction until the shift lever 30 is restored to the original position. For example, in the shift pattern shown in FIG. 14, the power may be applied according to a predetermined power pattern in the reverse direction with respect to the moving direction of the shift lever 30 until the driver selects a + or − position when the shift lever 30 is moved to a manual mode (M), and even after the point P2 at which the selecting of the + or − stage is completed, the power may be continuously applied in the reverse direction with respect to the moving direction of the shift lever 30, thereby allowing the shift lever 30 to be restored to an original position, that is, the manual mode M.

In FIG. 13, the invention is described with regard to when the pattern of the power continuously applied even after the point P2 at which the selecting of the + or − stage is completed is opposite to that of the power applied until the + stage or the − stage is selected, which is, however, provided by way of example only for a better understanding of the present invention, but not limited thereto. The power applied until the + stage (e.g., position) or the − stage is selected in the manual mode M and the power applied until the manual mode M is restored from the + stage or the − stage may have different patterns. In addition, the power applied until the + stage or the − stage may be selected in the manual mode M and the power applied until the manual mode M may be restored from the + stage or the − stage may have various patterns according to the actuation power generated.

In FIG. 13, the arrows indicated by dotted lines indicate moving directions of the shift lever 30 until the + stage or the − stage is selected in the manual mode M and the manual mode M is then restored from the + stage or the − stage. That is, as shown in FIG. 13, it is understood that the power may be continuously applied until shift lever 30 moves from the manual mode M via the + stage or the − stage to then be restored to the manual mode M.

FIG. 14 illustrates the actuation power generated when the respective shift positions are selected when the current shift position is at a D position. In FIG. 14, the arrows indicated by solid lines may indicate the second profile, the symbol "Δ" may indicate the first profile, and the arrows indicated by dotted lines may indicate the third profile. It may be understood that as the number of symbols "Δ" is increased, the peak value is increased in the first profile.

Meanwhile, the third profile shown in FIG. 13 corresponds to the shift pattern shown in FIG. 14, but is not limited thereto, and may also be applied to the shift pattern in which the shift lever 30 is positioned at a NULL position, moved in up-and-down (e.g., vertical) and left-and-right (e.g., horizontal) directions to select another shift position and then restored to the NULL position. For example, in such a shift pattern as shown in FIG. 15, the third profile shown in FIG. 13 may also be applied to the shift pattern in which the shift lever 30 is positioned at a NULL position, moved vertically and horizontally to select another shift position as well as the + stage or the − stage.

Figure 15:
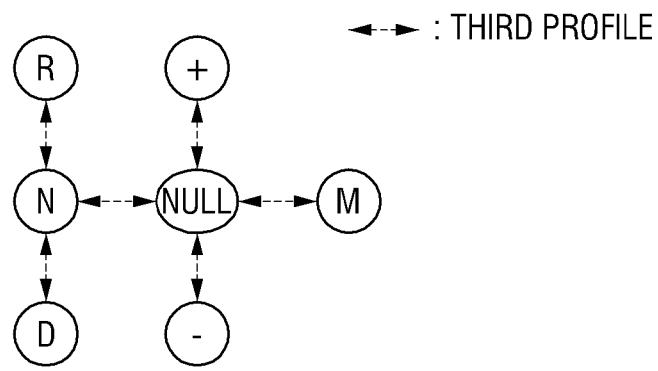
FIG. 15 is an exemplary graph illustrating a profile for each shift position in a shift pattern according to another embodiment of the present invention.
Figure 16:
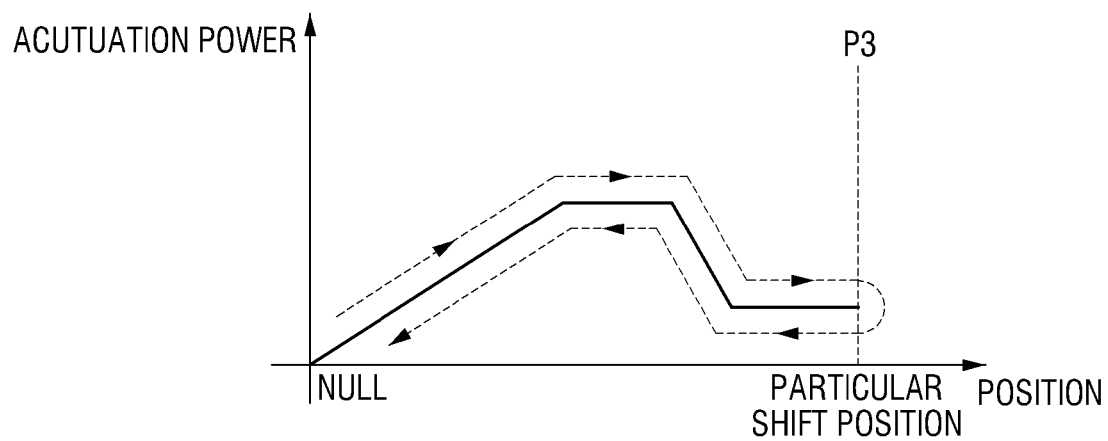
FIG. 16 is an exemplary graph illustrating a third profile based on the shift pattern shown in FIG. 15 according to an exemplary embodiment of the present invention.

A third profile for the shift pattern of FIG. 15 is shown in FIG. 16. FIG. 16 illustrates an example in which the actuation power according to the third profile is generated for all selectable shift positions.

Referring to FIG. 16, unlike in the shift pattern shown in FIG. 14, the power may be applied according to a predetermined power pattern in the reverse direction with respect to the moving direction of the shift lever 30 up to a point P3 at which the shift lever 30 positioned in the NULL position may select a particular shift position, such as a + stage, a − stage, an N position, an M position, an R position, or a D position, and even after the point P3 at which the selecting of the particular shift position may be completed, the power may be continuously applied in the reverse direction with respect to the moving direction of the shift lever 30, thereby allowing the shift lever 30 to be restored to an original position, that is, the NULL position.

In addition, when the R position is selected via the N position from the NULL position, as shown in FIG. 15, the first profile shown in FIG. 12 may be applied, and a direction in which the power is applied in the reverse direction when the shift position is restored to the NULL position from the R position may be changed according to the path in which the shift position is restored to the NULL position. In addition, in FIG. 16, the patterns of the power applied until the shift position is changed from the NULL position to select a particular shift position and the power applied until the shift position is changed from the particular shift position to then be restored to the NULL position may be different from each other. In addition, the power applied until the shift position is changed from the NULL position to select a particular shift position and the power applied until the shift position is changed from the particular shift position to then be restored to the NULL position may have various patterns according to the actuation power generated.

The profiles shown in FIGS. 10 to 13 and 16 are provided by way of example only for a better understanding of the present invention. The profiles of the actuation power applied in various conditions may be modified in various manners. The magnitudes and patterns of the actuation power generated by the first driving unit 110 and the second driving unit 120 may be set to optimum magnitudes and patterns through various experiments.

Moreover, at least one of the first driving unit 110 and the second driving unit 120 may be configured to generate the actuation power according to movement of the shift lever 30 in such normal conditions as described above, and may notify the driver that the driver's erroneous operation is determined. For example, the R position may be selectable only when the speed of a vehicle is a predetermined level or less when the brake pedal has been engaged. However, when the driver mistakenly tries to select the R position, a vibration pattern may be generated, thereby notifying the driver of an erroneous operation.

Figure 17:
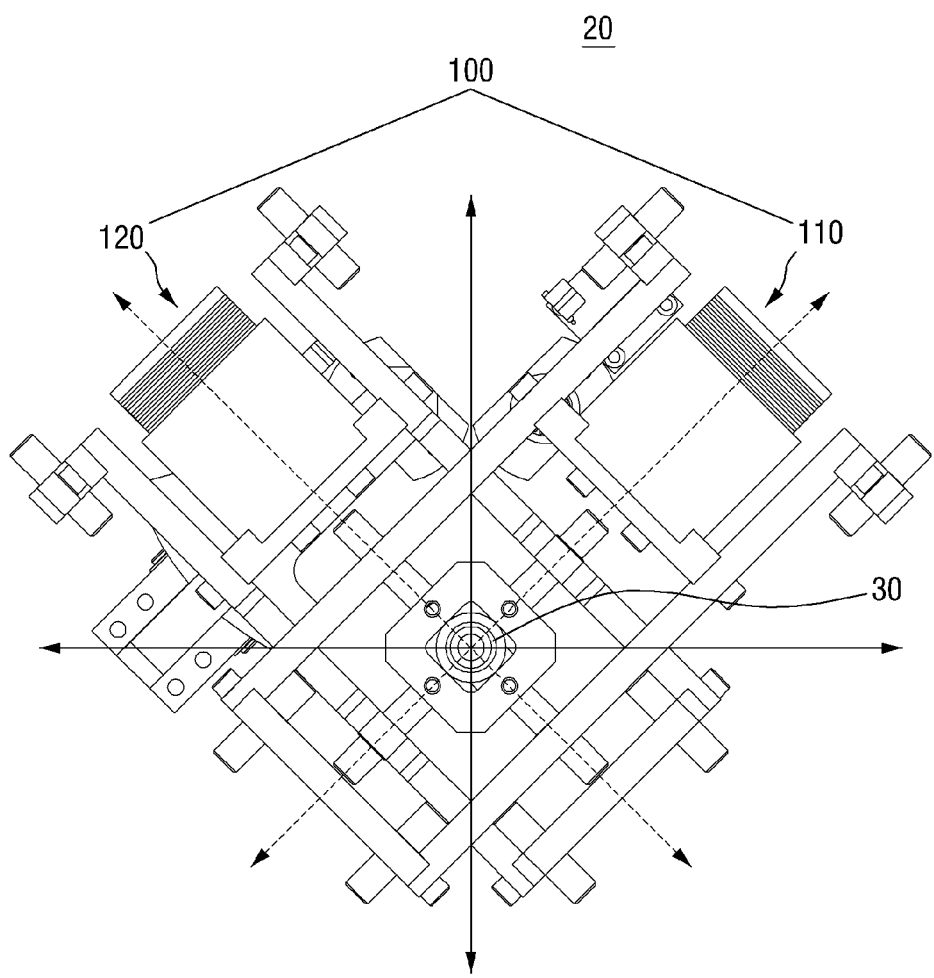
FIG. 17 is an exemplary schematic view illustrating a moving direction of a shift lever according to an embodiment of the present invention and directions of power applied by a first driving unit and a second driving unit.

In addition, in the exemplary embodiment of the present invention, the invention is described with regard to when the first driving unit 110 and the second driving unit 120 apply power to the shift lever 30 in the same direction as the moving direction of the shift lever 30, but aspects of the present invention are not limited thereto. In other words, the first driving unit 110 and the second driving unit 120 may apply power to the shift lever 30 obliquely in a predetermined angle. For example, when the shift lever 30 moves in multiple directions, as indicated by solid line arrows in FIG. 17, to then select a shift position, the first driving unit 110 and the second driving unit 120 may be configured to apply the power to the shift lever 30 indirectly in a predetermined angle with respect to the moving direction of the shift lever 30, as indicated by dotted line arrows in FIG. 17. Thus, two driving units 110 and 120 may be simultaneously operated in one of the multiple moving directions of the shift lever 30, to generate power greater than when the actuation power is generated by operating a single driving unit.

The first driving unit 110 and the second driving unit 120 may be configured to generate the actuation power in the reverse direction or the forward direction according to the movement of the shift lever 30. In some cases, the movement of the shift lever 30 may be restricted by a control signal applied to the first driving unit 110 and the second driving unit 120, thereby implementing a shift lock function to allow the shift lever 30 to move along a moving path of the shift lever 30 based on the selected shift pattern or to select a particular shift position only when predetermined conditions are satisfied.

In particular, when excessive power is applied to the shift lever 30, that is the power exceeds the power applied by the first driving unit 110 and the second driving unit 120, the shift lever 30 may deviate from the moving path based on the selected shift pattern or the shift lock function may not be properly implemented. Therefore, in the exemplary embodiment of the present invention, the moving path controller 200 and the first driving unit 110 and the second driving unit 120 may be configured to operate the shift lever 30 to move along the moving path according to the selected shift pattern and to implement the shift lock function to select the particular shift position only when predetermined conditions are satisfied.

The moving path controller 200 may be disposed in each of the first driving unit 110 and the second driving unit 120. In FIG. 7, only the first driving unit 110 is illustrated. However, the second driving unit 120 is substantially the same as the first driving unit 110 in view of components and functions, except for directions in which the first and second driving units 110 and 120 are formed. Thus, the following description of the moving path controller 200 will focus on the first driving unit 110, and the same description may also be applied to the second driving unit 120.

Figure 18:
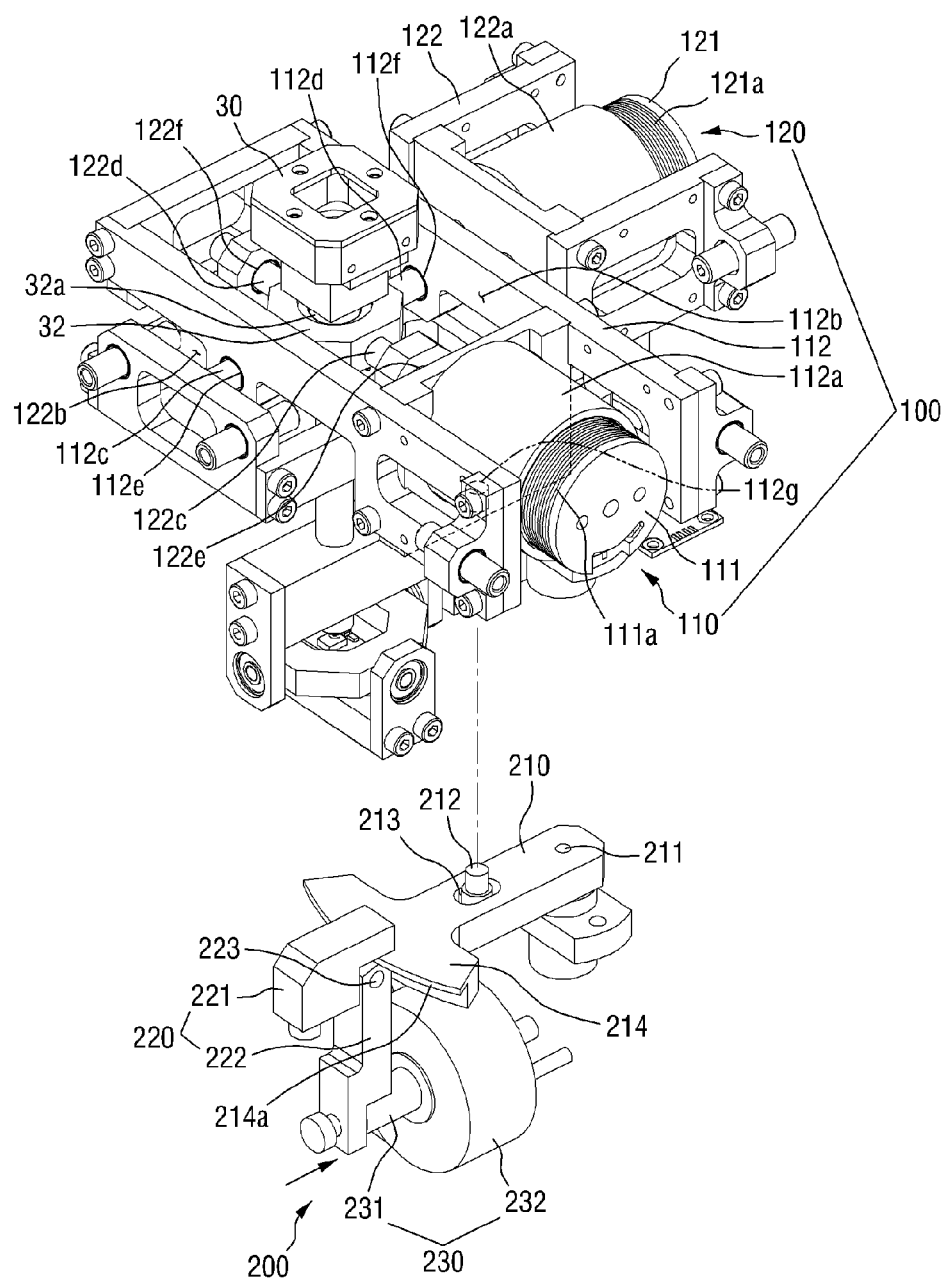
FIGS. 18 and 19 are exemplary views of a moving path controller according to an embodiment of the present invention.
Figure 19:
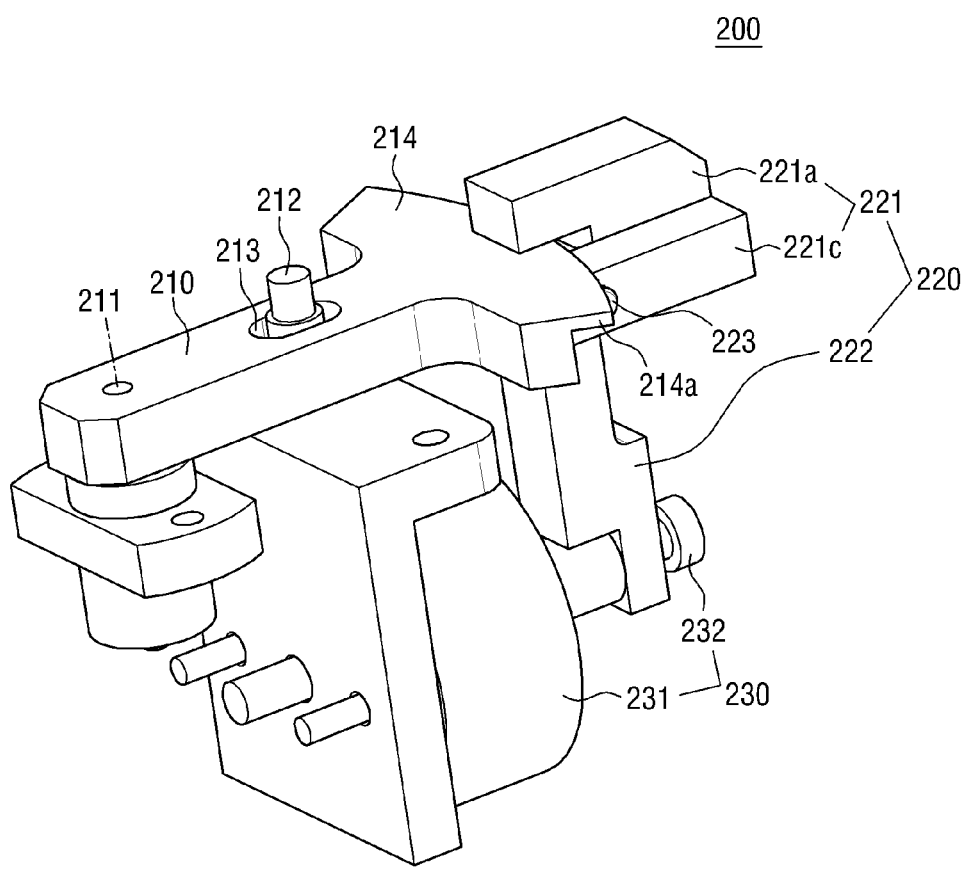
Figure 20:
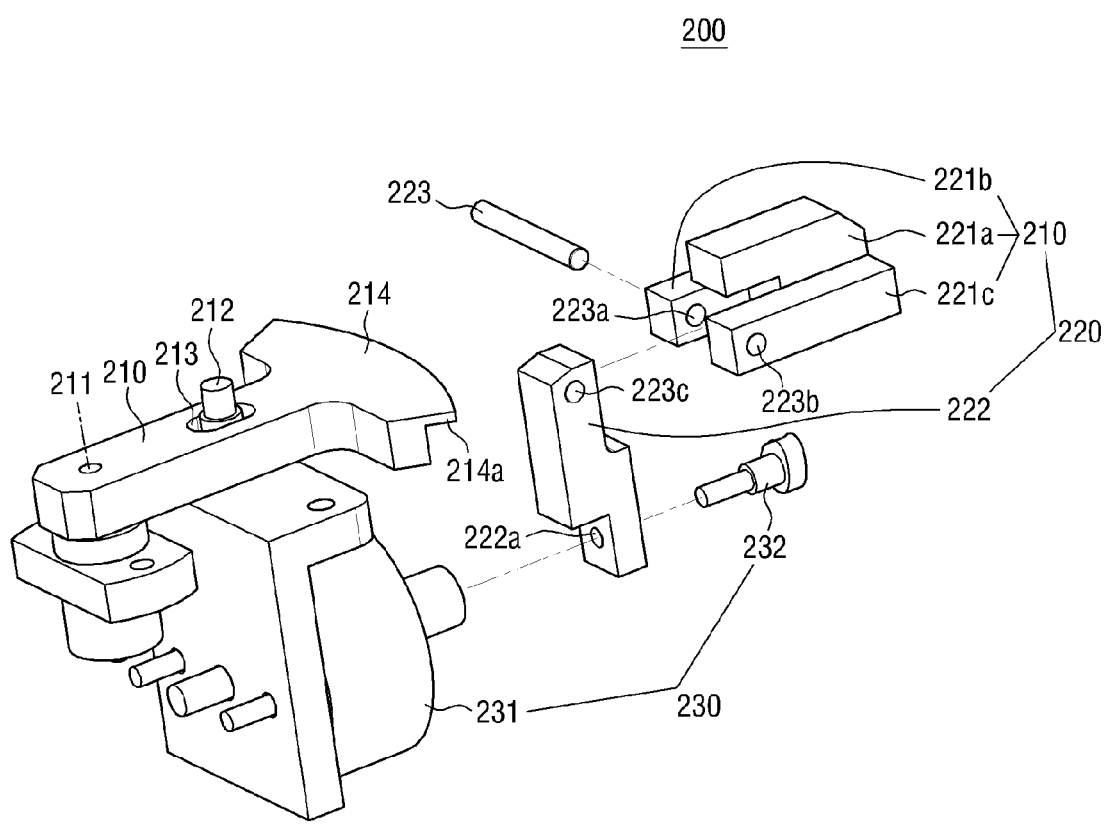
FIG. 20 is an exemplary detailed view of a moving path controller according to an embodiment of the present invention.
Figure 21:
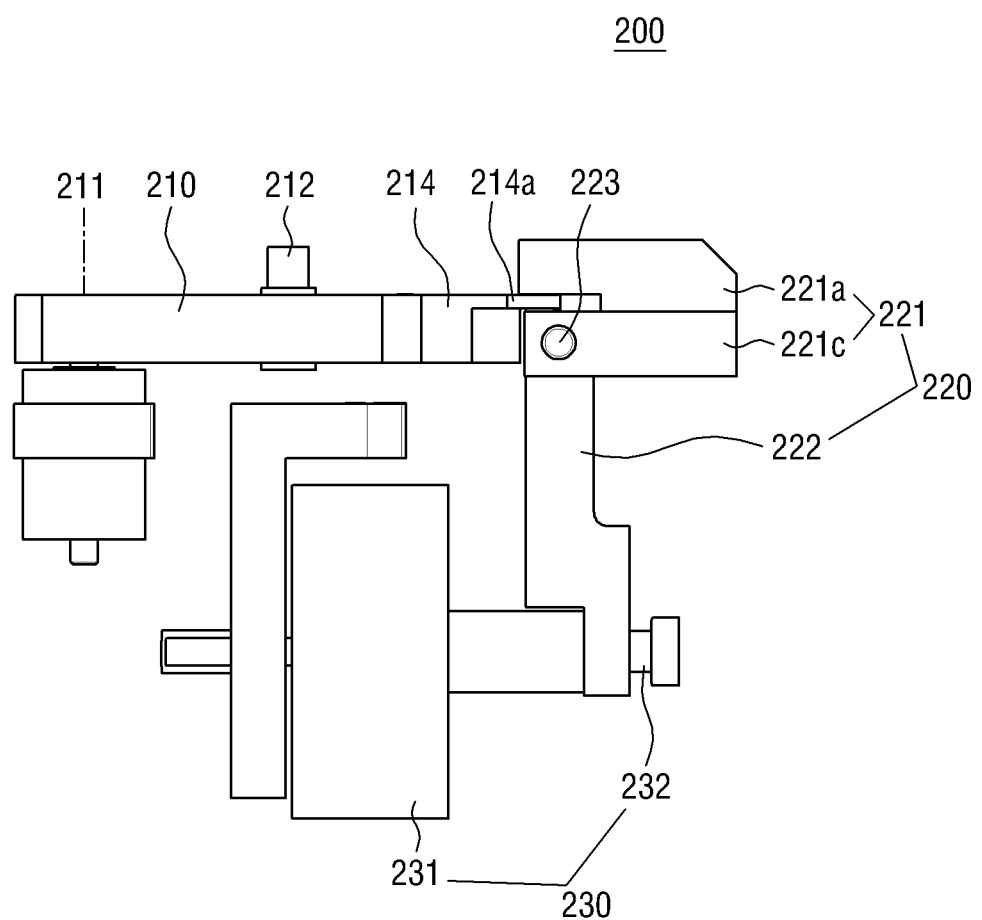
FIG. 21 is an exemplary side view of a moving path controller according to an embodiment of the present invention.

FIGS. 18 and 19 are exemplary views of a moving path controller according to an exemplary embodiment of the present invention, FIG. 20 is an exemplary detailed view of a moving path controller according to an exemplary embodiment of the present invention and FIG. 21 is an exemplary side view of a moving path controller according to an exemplary embodiment of the present invention.

As shown in FIGS. 18 and 19, the moving path controller 200 may include a rotation member 210 that rotates in one direction as the shift lever 30 moves, a contact member 220 that generates a frictional force in contact with one end of the rotation member 210, and a position adjustment unit 230 configured to maintain a contact or non-contact state of the contact member 220 by adjusting a position of the contact member 220. The rotation member 210 may rotate in one direction about a rotation shaft 211. A coupling protrusion 212 inserted into a coupling groove 112g formed in the first moving part 112 may be formed on one surface of the rotation member 210. The coupling groove 112g may be formed in the first moving part 112, which is, however, provided by way of example only for a better understanding of the present invention, but not limited thereto. The coupling groove 112g may be connected to the shift lever 30 and may be formed in a component moving together with the shift lever 30 when the shift lever 30 moves.

When the shift lever 30 moves, the rotation member 210 may rotate in one direction about the rotation shaft 211 by the coupling protrusion 212 inserted into the coupling groove 112g. In particular, the coupling protrusion 212 formed in the rotation member 210 and the coupling groove 112g formed in the first moving part 112 may be formed at various locations according to the configurations thereof.

Figure 22:
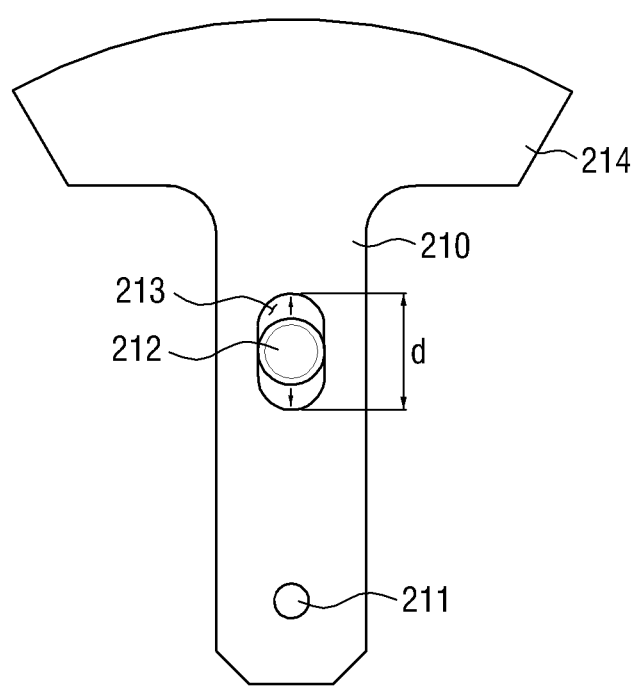
FIG. 22 is an exemplary schematic view illustrating a rotation member of a moving path controller according to an embodiment of the present invention.

In general, since the shift lever 30 moves linearly, the coupling protrusion 212 may move in an outer circumferential direction of the rotation member 210 along a guide groove 213 formed at a rotation range of the rotation member 210 to allow the rotation member 210 to rotate about the rotation shaft 211 as the shift lever 30 moves. In other words, as shown in FIG. 22, the coupling protrusion 212 according to the exemplary embodiment of the present invention, may move in a direction indicated by the arrow along the guide groove 213 formed on one surface of the rotation member 210 corresponding to the coupling groove 112g formed in the first moving part 112 with a length (d) that corresponds to the rotation range of the rotation member 210. When the shift lever 30 linearly moves by the guide groove 213, the rotation member 210 may rotate in one direction about the rotation shaft 211. In addition, the length d of the guide groove 213 may be modified in various manners according to the shift pattern.

Moreover, the rotation member 210 may rotate about the rotation shaft 211 as the shift lever 30 moves, which is, however, provided by way of example only for a better understanding of the present invention, but not limited thereto. The rotation member 210 may also be implemented to slidably move in the moving direction of the shift lever 30. In particular, when the shift lever 30 linearly moves, the coupling protrusion 212 or the coupling groove 112g formed in the first moving part 112, which are formed to allow the rotation member 210 to rotate about the rotation shaft 211, may not be provided.

Figure 23:
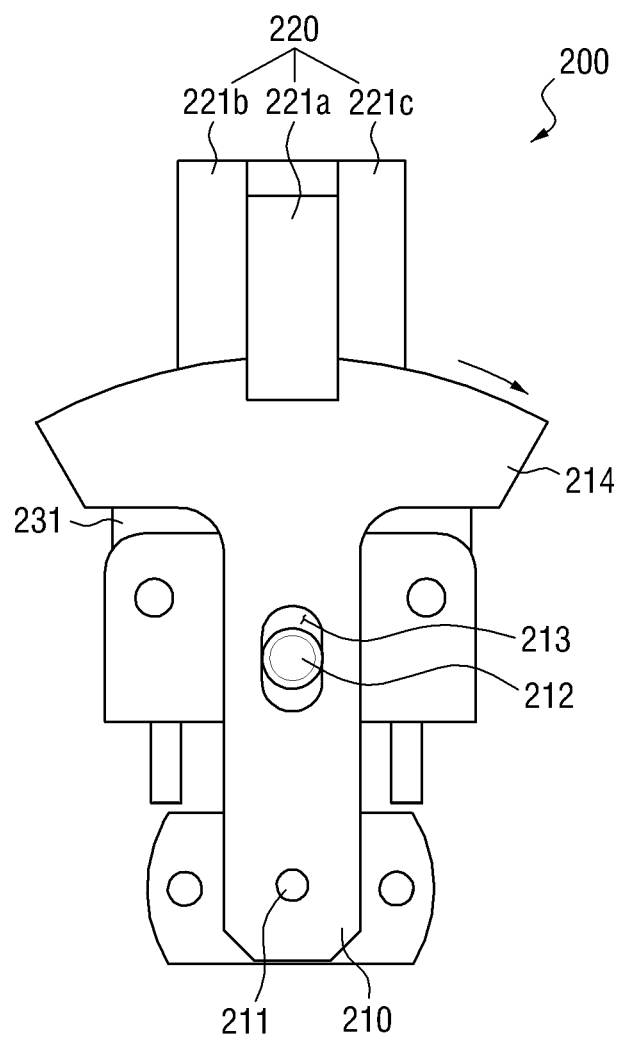
FIGS. 23 and 24 are exemplary plan views of a moving path controller according to an embodiment of the present invention.
Figure 24:
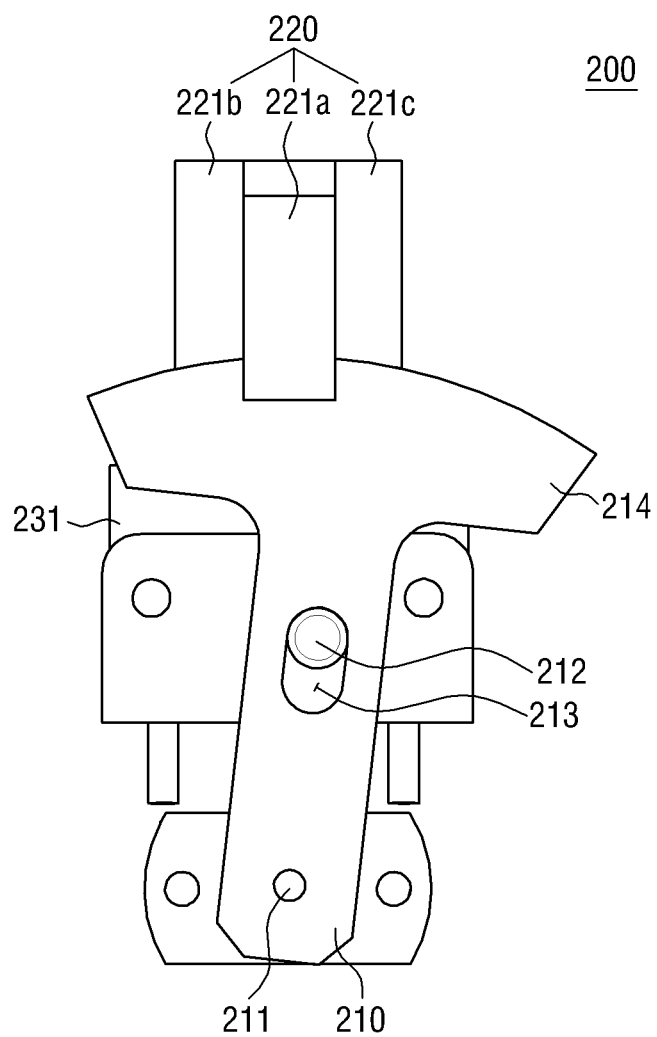

FIGS. 23 and 24 are exemplary plan views of a moving path controller according to an exemplary embodiment of the present invention. FIG. 24 illustrates an exemplary state in which the rotation member 210 is rotated in one direction as the shift lever 30 moves, as compared to a state shown in FIG. 23. When the current position of the rotation member 210 is the same as shown in FIG. 23, the rotation member 210 may also be rotated about the rotation shaft 211 in a direction indicated by the arrow of FIG. 23 as the shift lever 30 moves, to reach a state in which it is rotated in one direction, as shown in FIG. 24.

In FIG. 24, the rotation member 210 rotates in only a first direction of two rotatable directions, which is, however, provided by way of example only for a better understanding of the present invention, but not limited thereto. The rotation member 210 may also rotate in a second direction of the two rotatable directions, which is opposite to the first direction. In addition, FIG. 24 illustrates that the coupling protrusion 212 may be moved to one side of the guide groove 213, as compared to the coupling protrusion 212 shown in FIG. 23.

An outer circumferential end 214 of the rotation member 210 may be formed to have a predetermined curvature, and a protrusion 214a that protrudes outwardly to form a stepped portion may be formed. The exemplary embodiment of the present invention is described with regard to when the outer circumferential end 214 of the rotation member 210 is formed to have the stepped portion, which is, however, provided by way of example only for a better understanding of the present invention, but not limited thereto. In other words, the stepped portion may not be formed in the outer circumferential end 214 of the rotation member 210.

The contact member 220 may be formed at one side of the outer circumferential end 214 of the rotation member 210 and may include a first contact member 221 and a second contact member 222, which are spaced a predetermined distance apart from each other, forming a space into which the protrusion 214a may be inserted and positioned. The first contact member 221 may be fixedly installed, and the second contact member 222 may be connected to the first contact member 221 to be rotatable about a hinge shaft 223, which will be described by way of example. In addition, the protrusion 214a may be positioned between the first contact member 221 and the second contact member 222, which is, however, provided by way of example. When the protrusion 214a is formed in the outer circumferential end 214 of the rotation member 210, the outer circumferential end 214 of the rotation member 210 may be positioned between the first contact member 221 and the second contact member 222.

In particular, the first contact member 221 may be positioned in the outer circumferential direction a predetermined interval away from the protrusion 214a of the rotation member 210 and may include a bent portion 221a having one end (e.g., a top end) bent to face one surface (e.g., a top surface) of the rotation member 210, and a plurality of first coupling portions 221b and 221c formed at opposite sides of the bent portion 221a in a direction in which the rotation member 210 rotates. In the exemplary embodiment of the present invention, the plurality of first coupling portions 221b and 221c may be formed at opposite sides of the bent portion 221a, which is, however, provided by way of example, but not limited thereto. The plurality of first coupling portions 221b and 221c may also be formed at either side of the bent portion 221a.

One end of the second contact member 222 may be positioned between the plurality of first coupling portions 221b and 221c, and the hinge shaft 223a may pass through a plurality of first coupling apertures 223a and 223b formed in the plurality of first coupling portions 221b and 221c and a second coupling aperture 223c formed at one end of the second contact member 222 to then be inserted thereinto. Accordingly, the first contact member 221 and the second contact member 222 may be connected via the hinge shaft 223. The exemplary embodiment of the present invention is described by way of example with regard to when the first contact member 221 is fixedly installed. Thus, the second contact member 222 may be rotated in one direction about the hinge shaft 223.

The load 232 may linearly move and pass through an aperture 222a formed in the second contact member 222 to be connected to the driving unit 231. Further, the position adjustment unit 230 may include a driving unit 231 and a load 232 that moves in one direction by the driving unit 231. In the exemplary embodiment of the present invention, the position adjustment unit 230 may include a solenoid.

Figure 25:
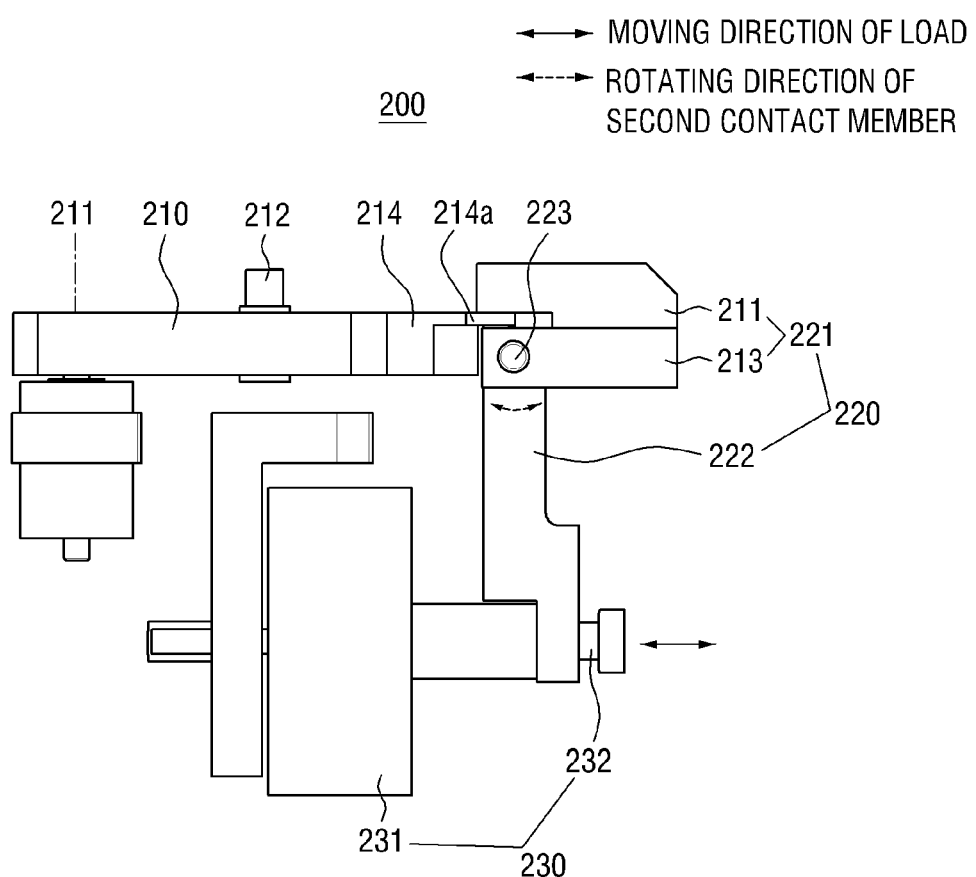
FIG. 25 is an exemplary schematic view illustrating an operation of a moving path controller according to an embodiment of the present invention.

Furthermore, one of the opposite ends of the second contact member 222 may be rotatably connected to the first contact member 221 via the hinge shaft 223 and the other opposite end of the second contact member 222 may be connected to the load 231. Thus, as shown in FIG. 25, when the load 231 linearly moves in one direction, the second contact member 222 may rotate about the hinge shaft 223. In FIG. 25, the arrow indicated by a solid line indicates the moving direction of the load 232, and the arrow indicated by a dotted line indicates the rotating direction of the second contact member 222.

Moreover, in the exemplary embodiment of the present invention, the protrusion 214a may be positioned between the first contact member 221 and the second contact member 222. In particular, when the load 231 is moved in one direction by the position adjustment unit 230, one end of the second contact member 222 may apply power to one surface of the protrusion 214a, causing the first contact member 221 and the second contact member 222 to contact both surfaces of the protrusion 214a and generating a frictional force, to restrict rotation of the rotation member 210.

The contact member 220 that restricts the rotation of the rotation member 210 will be described in more detail with reference to FIGS. 26 and 27. Specifically, FIG. 26 illustrates a state in which the rotation member 210 is rotatable, and FIG. 26 illustrates a state in which the rotation of the rotation member 210 is restricted by the contact member 220.

Figure 26:
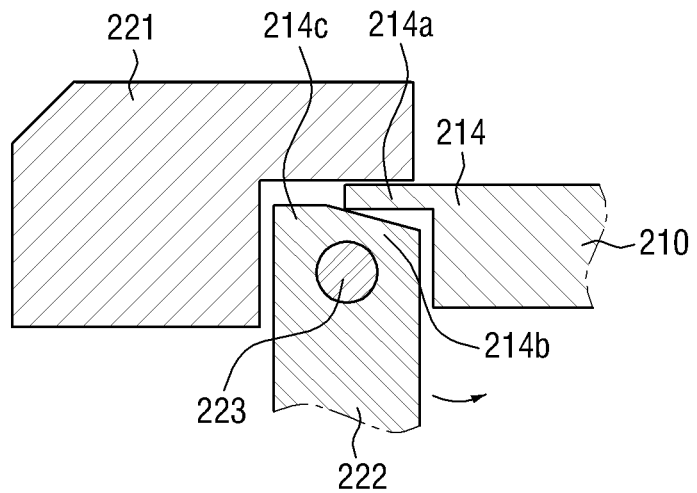
FIGS. 26 and 27 are exemplary cross-sectional views illustrating a contact member of a moving path controller according to an embodiment of the present invention.
Figure 27:
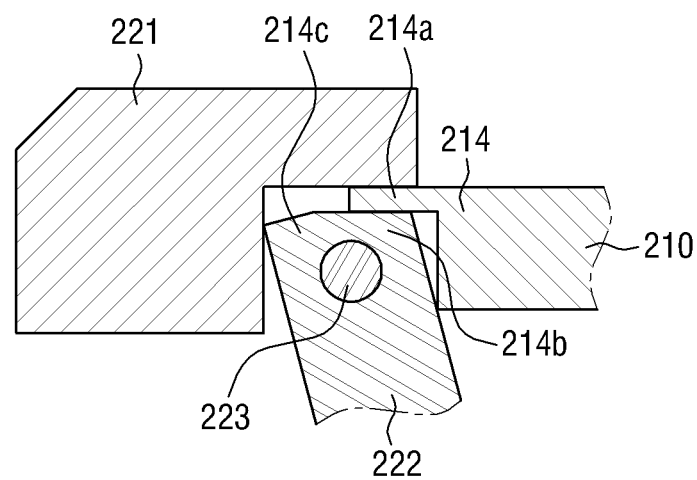

Referring to FIG. 26, the first contact member 221 and the second contact member 222 may be spaced at a predetermined distance apart from both surfaces of the protrusion 214a to form a space, and the protrusion 214a may be positioned within the space. As the shift lever 30 moves in one direction, the rotation member 210 may also be rotated in one direction about the rotation shaft 211.

As described above in FIG. 26, when the position adjustment unit 230 is operated to move the load 232 when the rotation member 210 is rotatable, the second contact member 222 may rotate about the hinge shaft 223 in the direction indicated by the arrow shown in FIG. 26. Accordingly, as shown in FIG. 27, at least a portion 214b of the second contact member 222 may contact one surface of the protrusion 214a at its one end to then apply power thereto, thereby allowing the first contact member 221 and the second contact member 222 to contact both surfaces of the protrusion 214a.

In particular, the at least the portion 214b of the second contact member 222 that contacts one surface of the protrusion 214a at its one end may be formed obliquely in a predetermined angle with respect to the one surface of the protrusion 214a to generate a greater force of friction with the protrusion 214a. In the exemplary embodiment of the present invention, in which the at least the portion 214b of the second contact member 222 is formed obliquely in the predetermined angle with respect to the one surface of the protrusion 214a at its one end, for the sake of convenient explanation, the invention is described with regard to when which the rotation member 210 is in a rotatable state.

For example, as described above in FIG. 26, when the rotation member 210 is in a rotatable state, the at least the portion 214b of the second contact member 222 may be formed obliquely in the predetermined angle with respect to the one surface of the protrusion 214a at its one end, and the other portion 214c of the second contact member 222 may be formed at its one end to be parallel to the one surface of the protrusion 214a. The second contact member 222 may be rotated about the hinge shaft 223 by the load 232 of the position adjustment unit 230 in a direction in which the rotation of the rotation member 210 is restricted. As described above in FIG. 27, the portion 214b, which is obliquely formed with respect to the protrusion 214a, as shown in FIG. 26, may contact the one surface of the protrusion 214a, and the other portion 214c may be formed obliquely with respect to the one surface of the protrusion 214a.

As described above, the at least one portion of the second contact member 222 may be formed obliquely in the predetermined angle with respect to the one surface of the protrusion 214a at its one end in the following reasons. When the one end of the second contact member 222 is substantially parallel to the one surface of the protrusion 214a, only an edge portion of the second contact member 222 may contact the one surface of the protrusion 214a at its one end when the second contact member 222 is rotated. However, when at least one portion of the second contact member 222 is formed obliquely in the predetermined angle with respect to the one surface of the protrusion 214a, the second contact member 222 and the one surface of the protrusion 214a may contact each other in an increased area, and a substantially large frictional force may be generated.

In the exemplary embodiment of the present invention, the at least the portion 214b of the second contact member 222 may be formed at its one end obliquely in a predetermined angle with respect to the one surface of the protrusion 214a and the other portion 214c may be formed to be parallel to the one surface of the protrusion 214a, which is, however, provided by way of example only for a better understanding of the present invention, but not limited thereto. To increase a contact area between the protrusion 214a and the second contact member 222, a tilt angle of the one end of the second contact member 222 may be modified in various angles when necessary.

The exemplary embodiment of the present invention is described by way of example with regard to when only the portion 214b of the second contact member 222 is formed at its one end obliquely with respect to the one surface of the protrusion 214a since a short-axis directional width of the second contact member 222 may be greater than a height of the protrusion 214a when viewed in the outer circumferential direction of the rotation member 210. However, when the height of the protrusion 214a is greater than or equal to the short-axis directional width of the second contact member 222, the one end of the second contact member 222 as a whole may be obliquely formed with the one surface of the protrusion 214a, causing the one end of the second contact member 222 to surface contact the one surface of the protrusion 214a when the second contact member 222 is rotated.

In addition, the exemplary embodiment of the present invention is described by way of example with regard to when the one surface of the protrusion 214a is planar, which is, however, provided by way of example only for a better understanding of the present invention, but not limited thereto. The one surface of the protrusion 214a may be substantially uneven. In addition, a portion of the second contact member 222 that contacts the one surface of the protrusion 214a may also be substantially uneven.

As described above, the moving path controller 200 may be formed in each of multiple moving directions of the shift lever 30, and components and functions of the moving path controllers 200 formed in the respective moving directions of the shift lever 30 may be substantially the same with each other, except for directions in which the respective moving path controllers 200 are formed according to the moving directions of the shift lever 30. In other words, when the shift lever 30 moves along a shift pattern shown in FIG. 28 and selects a shift position, the shift lever 30 may move in horizontal and vertical directions to then select a shift position. In particular, the moving path controller 200 may be disposed in each of the horizontal and vertical directions, to restrict the movement of the shift lever 30.

As described above, since the moving path controller 200 according to the exemplary embodiment of the present invention restricts the movement of the shift lever 30, the moving path controller 200 may be configured to operate the shift lever 30 to move along a moving path based on a particular shift pattern. Therefore, when selecting and using a shift pattern from a plurality of shift patterns, rotation of the rotation member 210 may be restricted to be suitable to the selected shift pattern without separately using an additional structure, thereby easily controlling the shift pattern.

In addition, the moving path controller 200 may be configured to operate the movement of the shift lever 30 based on the shift pattern and implement a shift lock function to select a particular shift position only when predefined conditions are satisfied. For example, the R position may be selectable only when the speed of a vehicle is a predetermined level or less when the brake pedal is engaged, and the movement of the shift lever 30 may be restricted in other cases.

Referring again to FIG. 28, the moving path controller 200 may be configured to form a blocking wall 200a in a predetermined range formed along the exterior side of the shift pattern selected by the shift pattern selection unit 10, for example, in a shape of a closed curve. The term "blocking wall" used in the exemplary embodiment of the present invention is provided only for a better understanding of the present invention, but not limited thereto. In alternative implantation embodiments, it may also be understood that the blocking wall may be formed along the exterior side of the shift pattern by restricting the rotation of the rotation member 210 to prevent the shift lever 30 from moving.

Moreover, to implement the shift lock function, the moving path controller 200 may include a shift locking wall 200b along its moving path, similar to the blocking wall 200a. The term "shift locking wall" used in the exemplary embodiment of the present invention is provided only for a better understanding of the present invention, but not limited thereto. In alternative implantation embodiments, it may also be understood that the shift locking wall 200b may be formed along the moving path of the shift lever 30 by restricting the rotation of the rotation member 210 using the contact member 220, similar to the blocking wall 200a.

Figure 28:
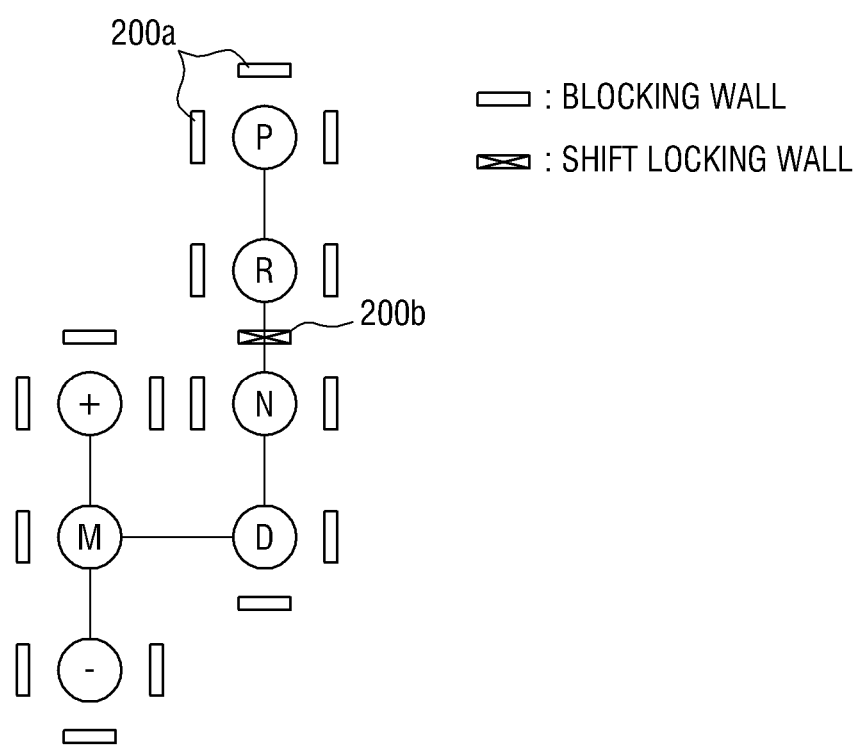
FIG. 28 is an exemplary schematic view illustrating a shift pattern blocking wall and a shift locking wall according to an embodiment of the present invention.

In the exemplary embodiment of the present invention, the moving path of the shift lever 30 may be controlled in the shift pattern shown in FIG. 28, which is, however, provided by way of example only for a better understanding of the present invention, but not limited thereto. The exemplary embodiment of the present invention may also be applied to shift patterns other than the shift pattern shown in FIG. 28. The shift control unit 20 may further include a position sensing unit 300 configured to determine whether a normal shift operation has been performed by determining the current shift position by sensing the position of the shift lever 30 to operate the actuation power generation unit 100 and the moving path controller 200 more accurately.

The position sensing unit 300 may be configured to sense the position of the shift lever 30 and may be configured to sense the current shift position based on the sensed position of the shift lever 30. The sensing result of the position sensing unit 300 may be transferred to the shift pattern selection unit 10, the actuation power generation unit 100, and the moving path controller 200 to be used in displaying a selected shift pattern or shift position, generating the actuation power according to the moving direction of the shift lever 30 or restricting the moving path of the shift lever 30.

Figure 29:
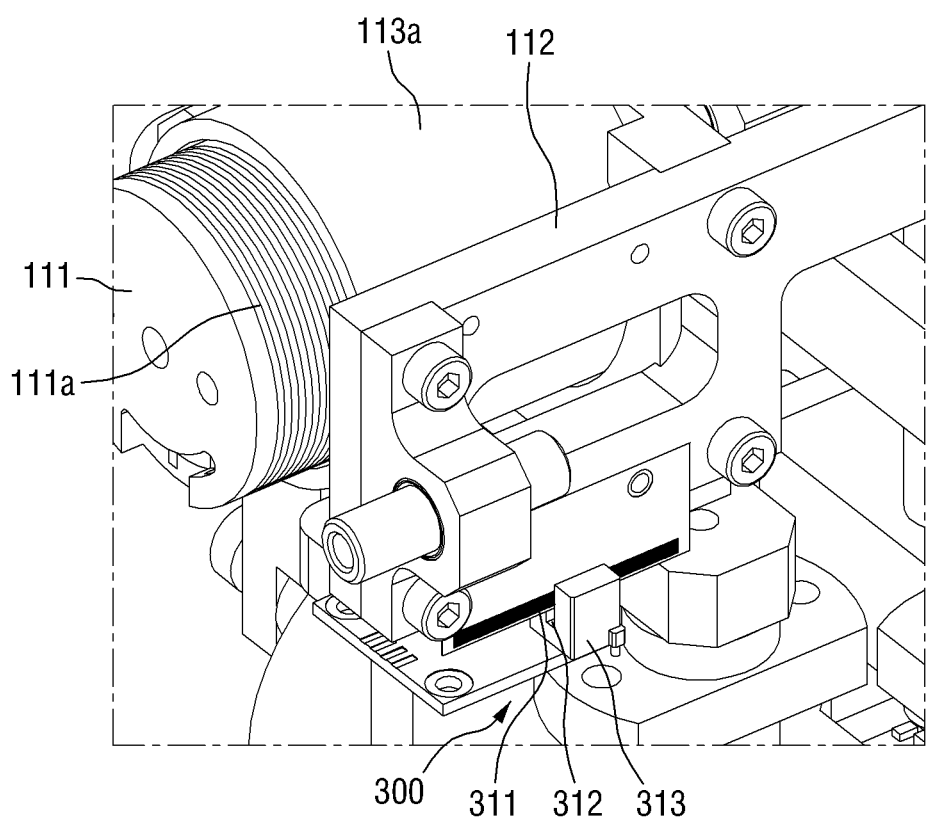
FIGS. 29 and 30 are exemplary schematic views illustrating a position sensing unit according to an embodiment of the present invention.
Figure 30:
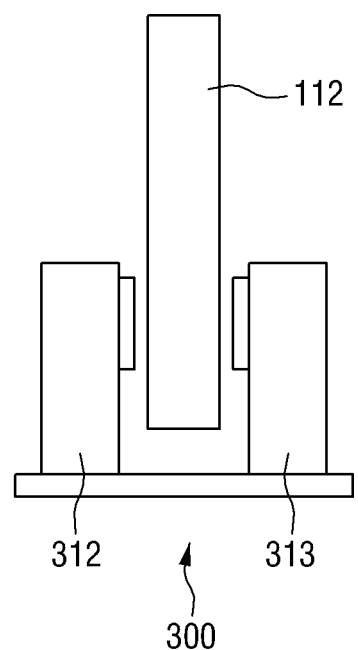

In particular, a position sensor may be used as the position sensing unit 300, which will be described by way of example with regard to when a light sensor or a three-dimensional (3D) hall sensor is used as the position sensor. The sensing result of the position sensing unit 300 may be transferred to the shift pattern selection unit 10 and the selected current shift position may be displayed by a shaded portion. When the position sensing unit 300 includes the light sensor, as shown in FIGS. 29 and 30, the position sensing unit 300 may include a plurality of slits 311 formed in one surface of the first moving part 112 along the moving direction of the first moving part 112, and a light emitting unit 312 and a light receiving unit 313 positioned at opposite sides of the plurality of slits 311 as light sensors.

The position sensing unit 300 may be configured to sense the number of slits 311 passing an area between the light emitting unit 312 and the light receiving unit 313, to sense the position of the shift lever 30, that is, a displacement, based on the sensing result. In particular, FIGS. 29 and 30 illustrate when the position sensing unit 300 is formed on one surface of the first moving part 112, which is, however, provided by way of example. The position sensing unit 300 may also be formed on the second moving part 122 as well as on the first moving part 112. In addition, the position sensing unit 300 may be formed in various locations.

Figure 31:
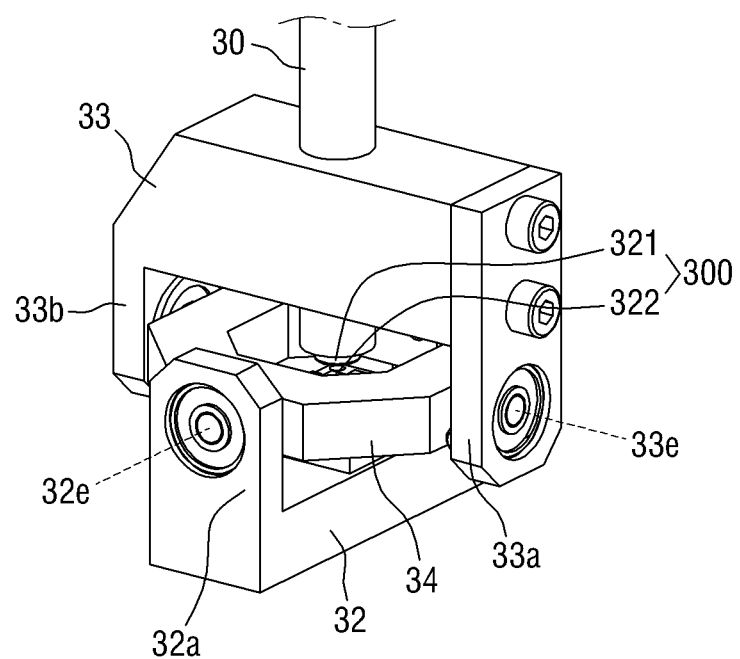
FIG. 31 is an exemplary view of a position sensing unit according to another embodiment of the present invention.
Figure 32:
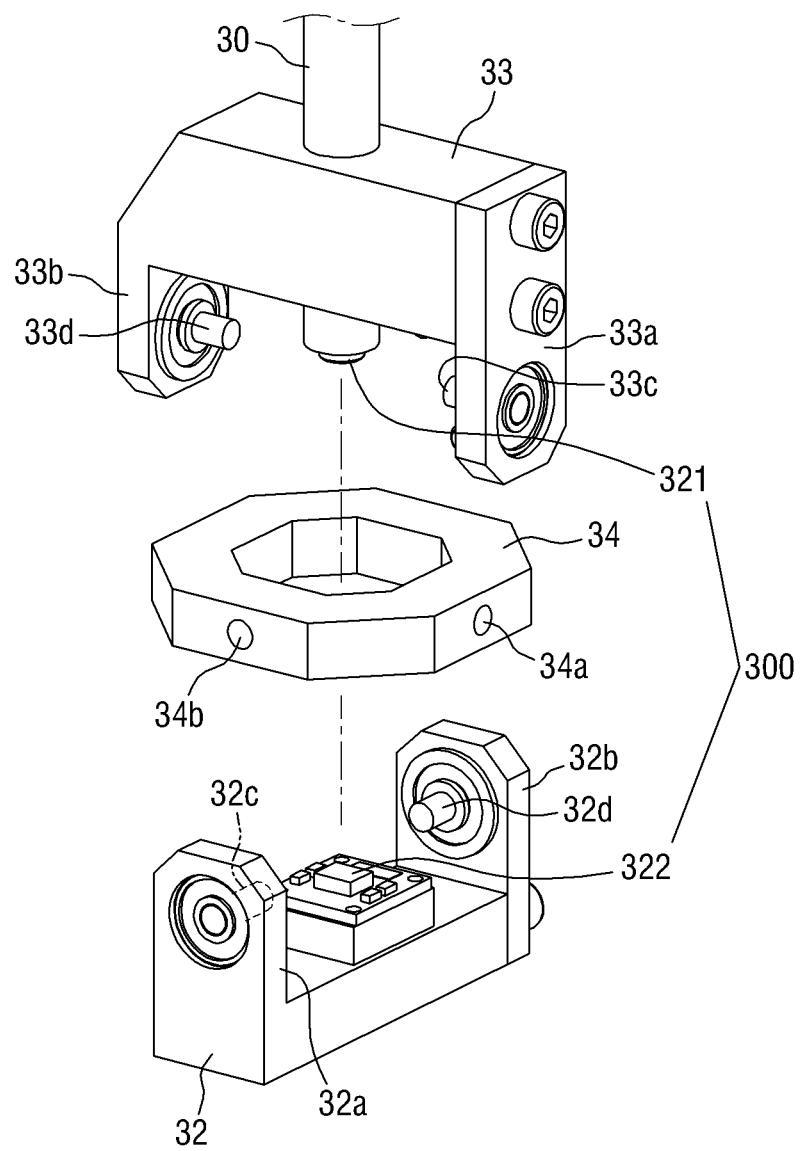
FIG. 32 is an exemplary detailed view of the position sensing unit shown in FIG. 31.

Furthermore, when the position sensing unit 300 includes the 3D hall sensor, as shown in FIGS. 31 and 32, the position sensing unit 300 may include a magnet 321 connected to one end (e.g., a lower end) of the shift lever 30, and a 3D hall sensor 322 installed to be spaced a predetermined distance apart from the lower end of the shift lever 30 and configured to sense a magnetic flux density induced by the magnet 321 mounted at the lower end of the shift lever 30, to sense the position of the shift lever 30. The magnet 321 and the 3D hall sensor 322 will now be described in detail.

The shift lever 30 may be moved in first and second directions by a first support unit 32, a second support unit 33 and a connection member 34. The first support unit 32 may have first bent portions 32a and 32b upwardly bent and formed at its opposite ends. The second support unit 33 may be formed at an upper side of the first support unit 32 to be perpendicular to the first support unit 32 to be connected to the shift lever 30 and may have second bent portions 33a and 33b downwardly bent and formed at its opposite ends. The first bent portions 32a and 32b and the second bent portions 33a and 33b may be connected by the connection member 34.

In other words, insertion protrusions 32c, 32d, 33c and 33d inserted into insertion grooves 34a and 34b formed in the connection member 34 may be formed in the first bent portions 32a and 32b and the second bent portions 33a and 33b, to connect the first bent portions 32a and 32b and the second bent portions 33a and 33b. Only some of the insertion grooves 34a and 34b into which the insertion protrusions 32c, 32d, 33c and 33d may be inserted are illustrated in FIG. 32. However, it should be understood that the other insertion grooves may also be formed in directions of the connection member 34, which are not shown in FIG. 32.

In particular, the 3D hall sensor 322 may be formed around the center of the first support unit 32, that is, around an intersection where the first rotation shaft 32e of the first support unit 32 and the second rotation shaft 33e of the second support unit 33 cross each other. As described above, when the 3D hall sensor 322 is formed around the intersection where the first rotation shaft 32e and the second rotation shaft 33e cross each other, one end of the shift lever 30 may be rotated while maintaining the substantially same distance from the 3D hall sensor 322 when the shift lever 30 moves in the first and second directions, to sense the position of the shift lever 30 more accurately.

In the exemplary embodiment of the present invention, the 3D hall sensor 322 maybe formed around the intersection where the first rotation shaft 32e and the second rotation shaft 33e cross each other, which is, however, provided by way of example only for a better understanding of the present invention, but not limited thereto. The 3D hall sensor 322 may also be formed at the exterior side of the rotation radius of the magnet 321 to sense the position of the shift lever 30. In addition, the 3D hall sensor 322 may be tilted in a predetermined angle to detect a displacement of the shift lever 30 more accurately.

To increase the accuracy in sensing the position of the shift lever 30, both of the light sensor and the 3D hall sensor may be used in the position sensing unit 300, but aspects of the present invention are not limited thereto. Only one of the light sensor and the 3D hall sensor may be used when sufficiently increased accuracy may be secured, and types of sensors used to sense a position may be modified in various manners.

Figure 33:
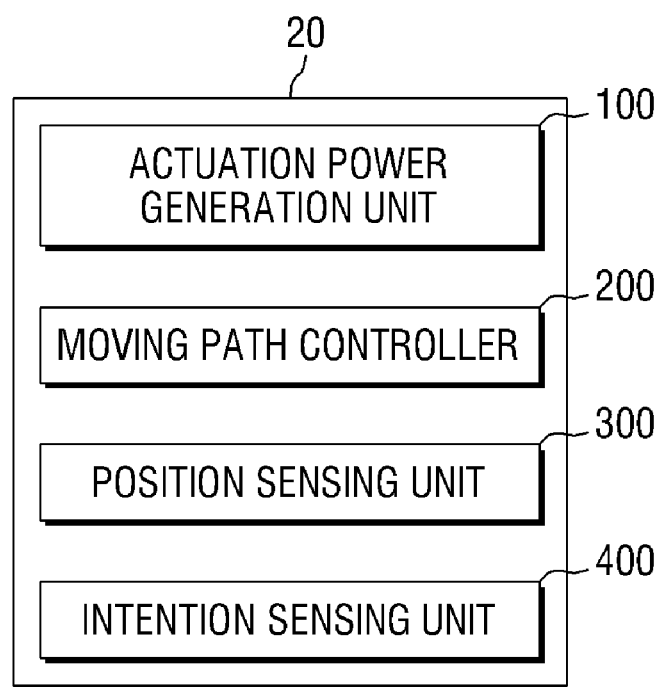
FIG. 33 is an exemplary block diagram of a shift control unit according to another embodiment of the present invention.

FIG. 33 is an exemplary block diagram of a shift control unit according to another embodiment of the present invention. As shown in FIG. 33, the shift control unit 20 according to another embodiment of the present invention may include an actuation power generation unit 100, a moving path controller 200, a position sensing unit 300, and an intention sensing unit 400 configured to sense driver's shift intention. In particular, the driver's shift intention may be understood as the driver's intention of grasping the shift lever 30 to select a shift position and the driver's intention of moving the shift lever 30 when the driver grasps the shift lever 30.

The illustrated exemplary embodiment of the present invention is described by way of example with regard to when an approach sensor and a tactile sensor are used as the intention sensing unit 400 to sense a shift intention.

In particular, under the assumption that a driver grasps the shift lever 30 to select a shift position, the approach sensor may sense when a body part of the driver, for example, a hand, approaches the automotive transmission 1. Various components 100, 200 and 300 of the shift control unit 20 may perform various functions based on the sensing result of the approach sensor. For example, when the actuation power generation unit 100, the moving path controller 200 and the position sensing unit 300 continuously perform operations when the vehicle is in a stop position or a park position, battery power consumption may increase. Thus, the approach sensor may be configured to sense an intention to select the shift position and may then perform the operation according to the sensing result.

The approach sensor may be installed at one side of the shift control unit 20 or the shift lever 30. Alternatively, the approach sensor may also be installed at any location within the vehicle as long as the driver's movement may be easily detected. The tactile sensor is a sensor that may be configured to sense information regarding a touch and may be configured to sense the touch information, such as the intensity or direction of pressure, caused by a touch, or the temperature, in real time. The tactile sensor may be used to sense a moving direction of the shift lever 30 or the intensity of power when the driver grasps the shift lever 30. In the exemplary embodiment of the present invention, the tactile sensor is described by way of example with regard to when the tactile sensor is installed within a knob 31 that serves as a handle of the shift lever 30.

Since the driver moves the shift lever 30 by grasping the knob 31 to select a shift position, the tactile sensor may be configured to sense the intensity and direction of power applied by the driver. The sensing result of the tactile sensor may be used to determine the direction of the shift lever 30 or to select a shift position when the actuation power generation unit 100 generates actuation power or the moving path controller 200 operates the moving path of the shift lever 30.

For example, when the driver intends to move the current shift position to select another shift position, the actuation power generation unit 100 may be configured to generate the actuation power in one of the profiles shown in FIGS. 10 to 13 and 16, based on the sensing result of the tactile sensor, in consideration of the fact that the power having a relatively great magnitude may be applied when the shift position is moved from current shift position to another via a substantial amount of shift positions, compared to when a shift position to be selected is adjacent (e.g., the next shift position) to the current shift position. Therefore, the shift position may be controlled more rapidly and accurately by moving the shift lever 30 than when the moving path and the actuation power are controlled.

Moreover, as described above, the automotive transmission 1 according to the exemplary embodiment of the present invention may be configured to select the shift position based on the shift pattern selected by the driver and may be configured to operate various vehicle functions.

Figure 34:
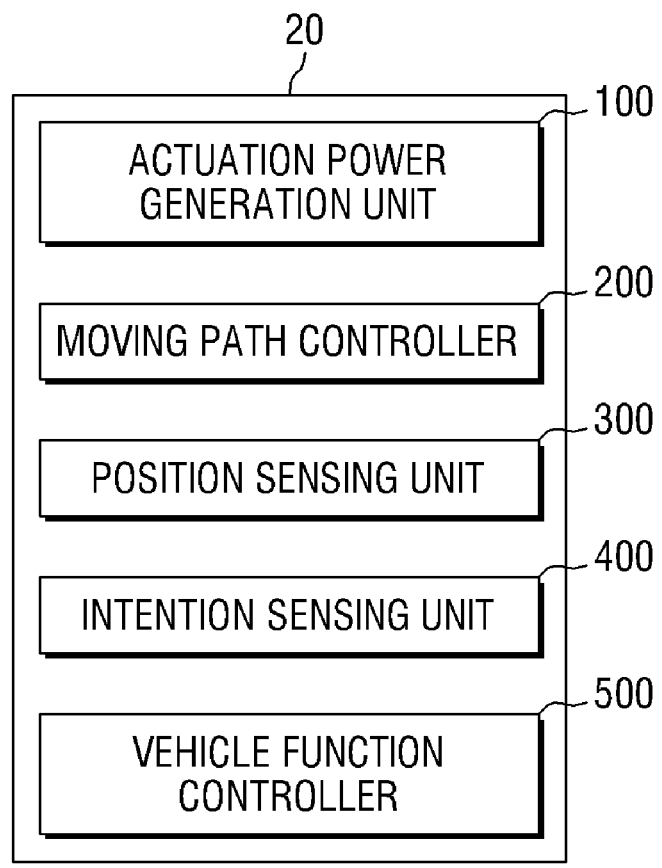
FIG. 34 is an exemplary block diagram of a shift control unit according to still another embodiment of the present invention.

FIG. 34 is an exemplary block diagram of a shift control unit according to still another embodiment of the present invention. As shown in FIG. 34, the shift control unit 20 according to still another exemplary embodiment of the present invention may include an actuation power generation unit 100, a moving path controller 200, a position sensing unit 300, an intention sensing unit 400 and a vehicle function controller 500. In particular, since the actuation power generation unit 100, the moving path controller 200, the position sensing unit 300 and the intention sensing unit 400 are the same as those described above in the previous embodiment, detailed descriptions thereof will be omitted.

The vehicle function controller 500 allows the driver to use the automotive transmission 1 according to the present invention in operating the vehicle, rather than in selecting a shift position when the vehicle is in a stop position or a park position. In the exemplary embodiment of the present invention, the vehicle function controller 500 is described by way of example with regard to when the automotive transmission 1 operates vehicle functions, but operating conditions of the vehicle function controller 500 may be modified in various conditions.

When the vehicle is in a stop position or a park position, for example, since a probability of the shift lever 30 being moved is substantially low and occurrence of automotive accidents is rare, the vehicle function controller 500 allows the driver to operate various functions of the vehicle using the shift control unit 20, as shown in FIG. 35. In the exemplary embodiment of the present invention, the operating of the vehicle functions may include operating navigation, an audio visual (AV) system and an air conditioning system, which are, however, provided by way of example only for a better understanding of the present invention, but not limited thereto.

In addition, when the shift control unit 20 is used to operate the vehicle functions by the vehicle function controller 500, the operating of the moving path by the moving path controller 200 may be cancelled to allow the shift lever 30 to move in an arbitrary direction. For example, when the driver intends to search for a destination from the navigation system, to adjust the sound volume of a music, or to adjust the indoor temperature, the vehicle function controller 500 may be configured to operate the moving path controller 200 to cancel the operation of the movement of the shift lever 30 since the shift lever 30 is to be moved in all directions according to the interface provided by each vehicle function.

In the exemplary embodiment of the present invention, when the shift control unit 20 is used in operating the vehicle functions by the vehicle function controller 500, the shift lever 30 may be moved in all directions, which is, however, provided by way of example only for a better understanding of the present invention, but not limited thereto. The movement of the shift lever 30 may be selectively restricted according to the interface that corresponds to various functions of the vehicle. For example, in the interface, such as a destination search using the navigation system, the shift lever 30 may move in a horizontal or vertical direction.

When the driver's shift intention is sensed by the intention sensing unit 400, the vehicle function controller 500 may be configured to activate functions of the shift pattern selection unit 10 in cooperation with the actuation power generation unit 100, the moving path controller 200, the position sensing unit 300 and the intention sensing unit 400 while blocking the vehicle function control from being performed by the shift control unit 20. In addition, when the shift control unit 20 is used in operating vehicle functions by the vehicle function controller 500, the interface that corresponds to each vehicle function may be displayed via the shift pattern selection unit 100.

The automotive transmission according to the present invention may have at least one of the following effects.

First, the shift pattern based on driver preference may be selected without changing the structure of the automotive transmission. In addition, since a shift position may be selected through the shift pattern displayed on a display unit, the shift pattern may be more intuitively selected. In addition, since a shift intention may be sensed, and the shift lever may be moved and actuation power may be controlled according to the sensing result, the movement of the shift lever may be more rapidly and accurately controlled. Further, since the shift lever may be used in selecting a shift position and operating vehicle functions, driver's convenience may be improved.

Additional aspects and/or advantages of the invention will be set forth in part in the description which follows and, in part, will be obvious from the description, or may be learned by practice of the invention.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the accompanying claims.

What is claimed is:

1. An automotive transmission comprising:
 a controller configured to:
  input a selection value based on a shift pattern selected from a plurality of shift patterns, wherein the plurality of shift patterns include a reverse (R) stage, a neutral (N) stage, a drive (D) stage, and a null position; and
  operate a shift lever connected to the automotive transmission to move through a moving path based on the selected shift pattern in response to sensing a shift intention;
  operate the automotive transmission to actuate a particular gear according to the movement of the shift lever;
  operate the moving path of the shift lever based on the selected shift pattern; and
  sense a position of the shift lever using a position sensing unit,
 wherein when the selection value is input, the shift position is set at an initial position based on the selected shift pattern,
 wherein location of the null position is different based on the selected shift pattern,
 wherein the controller is further configured to operate the transmission to actuate the particular gear according to at least one profile, wherein power is applied to at least one direction of a reverse direction and a forward direction of the moving direction of the shift lever, and
 wherein the at least one profile includes a first profile in which power that is applied in the reverse direction along the moving path to select another shift position via at least one shift position from the current shift position gradually increases.

2. The automotive transmission of claim 1, wherein the controller is further configured to sense the shift intention using an approach sensor and a tactile sensor.

3. The automotive transmission of claim 1, wherein the controller is further configured to: output via a touch screen display device the plurality of shift patterns in a predetermined order, wherein the plurality of shift patterns are sequentially displayed in a movement direction from a contact point.

4. The automotive transmission of claim 1, wherein the controller is further configured to output at least one of the selected shift patterns and the shift position via a head up display (HUD) or a cluster.

5. The automotive transmission of claim 1, wherein the controller is further configured to block the shift lever from deviating from a predetermined range formed along the exterior side of the selected shift pattern and selectively block the selected shift pattern from moving to a particular shift position on the moving path.

6. The automotive transmission of claim 1, wherein the controller is further configured to operate the transmission to actuate the particular gear by a combination of power from multiple driving units.

7. The automotive transmission of claim 1 wherein the at least one profile further includes:
a second profile in which power is applied in the reverse direction along the moving path up to a reference point of the moving path of the shift lever when a next shift position is selected, and power is applied in the forward direction along the moving path after the reference point; and
a third profile in which power is applied in the reverse direction along the moving path to allow the shift lever to be restored to an original position after the shift lever moves from the current shift position and selecting of the other shift position is completed,
wherein the movement in the reverse direction provides a resistive force to the shift lever.

8. The automotive transmission of claim 7, wherein in the second profile, the power applied in the reverse direction and the power applied in the forward direction gradually increase up to respective peak values and then gradually decrease.

9. The automotive transmission of claim 1, wherein in the first profile, the power applied when the shift lever moves from the previous shift position and then reaches the middle shift position and the power applied when the shift lever starts to move from the middle shift position to the next shift position are set to have different magnitudes.

10. The automotive transmission of claim 7, wherein in the third profile, the power applied in the reverse direction is continuously maintained until the shift lever is restored to the original position.

11. The automotive transmission of claim 1, wherein the controller is further configured to generate actuation power having a predetermined pattern that indicates an erroneous operation of the shift lever.

12. The automotive transmission of claim 1, wherein the position sensing unit includes a position sensor configured to sense the position according to movement of the shift lever.

13. The automotive transmission of claim 2, wherein the approach and tactile sensors are configured to sense power applied to the shift lever.

14. The automotive transmission of claim 13, wherein the tactile sensor is configured to sense at least one of a direction and an intensity of the power applied to the shift lever.

* * * * *